(12) United States Patent
Yuile et al.

(10) Patent No.: US 11,704,129 B2
(45) Date of Patent: Jul. 18, 2023

(54) TRANSPARENT INTERPRETATION AND INTEGRATION OF LAYERED SOFTWARE ARCHITECTURE EVENT STREAMS

(71) Applicant: Board of Trustees of the University of Illinois, Urbana, IL (US)

(72) Inventors: Adam Bates Yuile, Champaign, IL (US); Wajih Ul Hassan, Champaign, IL (US); Mohammad Noureddine, Urbana, IL (US)

(73) Assignee: The Board of Trustees of the University of Illinois, Urbana, IL (US)

( * ) Notice: Subject to any disclaimer, the term of this patent is extended or adjusted under 35 U.S.C. 154(b) by 406 days.

(21) Appl. No.: 17/247,038

(22) Filed: Nov. 24, 2020

(65) Prior Publication Data
US 2021/0157583 A1     May 27, 2021

Related U.S. Application Data

(60) Provisional application No. 62/940,114, filed on Nov. 25, 2019.

(51) Int. Cl.
*G06F 16/00*     (2019.01)
*G06F 9/30*     (2018.01)
(Continued)

(52) U.S. Cl.
CPC .......... *G06F 9/3005* (2013.01); *G06F 9/3017* (2013.01); *G06F 9/542* (2013.01); *G06F 16/1734* (2019.01); *G06F 40/205* (2020.01)

(58) Field of Classification Search
CPC .... G06F 21/552; G06F 16/1734; G06F 9/542; G06F 40/205; G06F 9/3017; G06F 9/3005
See application file for complete search history.

(56) References Cited

U.S. PATENT DOCUMENTS

| 9,727,394 B2 | 8/2017 | Xun et al. |
| 9,736,173 B2 | 8/2017 | Li et al. |

(Continued)

FOREIGN PATENT DOCUMENTS

EP     3493085 A1     6/2019

OTHER PUBLICATIONS

Oliner et al., "Advances and challenges in log analysis", Communications of the ACM, vol. 55, No. 2, pp. 55-61, 2012.
(Continued)

*Primary Examiner* — Yicun Wu
(74) *Attorney, Agent, or Firm* — Lowenstein Sandler LLP

(57) ABSTRACT

A computerized method includes analyzing program code, including a control flow graph, of one or more applications that are executable by an operating system of a computing device to determine event-logging functions of the program code that generate event logs; extracting, by the processing device based on the event-logging functions, log message strings from the program code that describes event-logging statements; identifying, by the processing device, via control flow analysis, possible control flow paths of the log message strings through the control flow graph; storing, in a database accessible by the processing device, the possible control flow paths; and inputting, by the processing device into a log parser, the possible control flow paths of the log message strings to facilitate interpretation of application events during runtime execution of the one or more applications.

22 Claims, 15 Drawing Sheets

(51) Int. Cl.
*G06F 9/54* (2006.01)
*G06F 40/205* (2020.01)
*G06F 16/17* (2019.01)

(56) References Cited

U.S. PATENT DOCUMENTS

| | | |
|---|---|---|
| 9,832,217 B2 | 11/2017 | Berger et al. |
| 9,928,366 B2 | 3/2018 | Ladnai et al. |
| 2017/0244733 A1 | 8/2017 | Wu et al. |
| 2018/0336349 A1 | 11/2018 | Zhang et al. |
| 2019/0121979 A1 | 4/2019 | Chari et al. |

OTHER PUBLICATIONS

Pasquier et al., "Camflow: Managed datasharing for cloud services", in IEEE Transactions on Cloud Computing, vol. 5, No. 3, pp. 472-484, Jul.-Sep. 2015.
Pecchia et al., "Industry practices and event logging: Assessment of a critical software development process", in International Conference on Software Engineering, IEEE, pp. 169-178, 2015.
Pei et al., "HERCULE: Attack story reconstruction via community discovery on a correlated log graph", In Proceedings of the 32nd Annual Conference on Computer Security Applications, ACM, pp. 585-595, Dec. 5-9, 2016.
Pohly et al., "Hi-Fi: Collecting high-fidelity whole-system provenance", in ACSAC, pp. 259-268, Dec. 3-7, 2012.
Schmidt, S., "7 more good tips on logging", http://codemonkeyism.com/7-more-good-tips-on-logging/, Feb. 23, 2009, 4 pages, accessed Aug. 1, 2022.
Shang et al., "Assisting developers of big data analytics applications when deploying on hadoop clouds", in ICSE, IEEE Press, pp. 402-411, 2013.
Shoshitaishvili et al., "SoK: (State of) The Art of War: Offensive techniques in binary analysis", in IEEE Symposium on Security and Privacy, pp. 138-157, 2016.
Sigelman et al., "Dapper, a large-scale distributed systems tracing infrastructure", Google, Inc, Technical Report dapper, 14 pages, Apr. 1, 2010.
Stamatogiannakis et al., "Looking inside the black-box: Capturing data provenance using dynamic instrumentation", in IPAW, Springer-Verlag New York, Inc., pp. 155-167, 2015.
Tam et al., "CopperDroid: Automatic reconstruction of android malware behaviors", in NDSS, 15 pages, Feb. 8-11, 2015.
Tariq et al., "Towards automated collection of application-level data provenance", in TaPP. USENIX, 5 pages, 2012.
Wang et al., "Fear and logging in the internet of things", in Network and Distributed Systems Security Symposium, 16 pages, Feb. 18-21, 2018.
Wu et al., "Zeno: Diagnosing performance problems with temporal provenance", in Networked Systems Design and Implementation, 27 pages, Feb. 26-28, 2019.
Xu et al., "Detecting large-scale system problems by mining console logs", in SOSP. ACM, pp. 117-131, Oct. 11-14, 2009.
Yu et al., "Cloudseer: Workflow monitoring of cloud infrastructures via interleaved logs", ACM SIGOPS Operating Systems Review, vol. 50, No. 2, pp. 489-502, Apr. 2-6, 2016.
Yuan et al., "Droidforensics: Accurate reconstruction of android attacks via multi-layer forensic logging", in Asia CCS. ACM, pp. 666-677, Apr. 2-6, 2017.
Yuan et al., "Improving software diagnosability via log enhancement", ACM Transactions on Computer Systems, vol. 30, No. 1, Article 4, 28 pages, Feb. 2012.
Yuan et al., "SherLog: Error diagnosis by connecting clues from run-time logs", in ASPLOS. ACM, pp. 143-154, Mar. 13-17, 2010.
Zhao et al., "Iprof: A non-intrusive request flow profiler for distributed systems", In Operating Systems and Design Implementation Symposium, 17 pages, Oct. 6-8, 2014.
Zhao et al., "Non-intrusive performance profiling for entire software stacks based on the flow reconstruction principle", in Operating Systems Design and Implementation Symposium, pp. 603-618, 2016.
Zhu et al., "Learning to Log: Helping developers make informed logging decisions", in International Conference on Software Engineering, pp. 415-425, 2015.
"System administration utilities" man7.org/linux/man-pages/man8/auditd.8.html/, 4 pages, accessed Aug. 3, 2022.
Xu et al., "Constructing precise control flow graphs from binaries," University of California, Davis, Tech. Rep, Tech. Rep., 22 pages, 2009.
"Apache HTTP server benchmarking tool", https://httpd.apache.org/docs/2.4/programs/ab.html, 2 pages, accessed Aug. 1, 2022.
"Benchmark for ftp servers", https://pypi.python.org/pypi/ftpbench, 5 pages, accessed Aug. 1, 2022.
"DTrace", https://www.freebsd.org/doc/handbook/dtrace.html, 7 pages, accessed Aug. 1, 2022.
"Event tracing", https://docs.microsoft.com/en-us/windows/desktop/ETW/event-tracing-portal, 3 pages, accessed Aug. 1, 2022.
"The Linux audit daemon", https://linux.die.net/man/8/auditd, 2 pages, accessed Aug. 1, 2022.
"Logstash: Collect, Parse, Transform Logs", https://www.elastic.co/products/logstash, 7 pages, accessed Aug. 1, 2022.
"Splunk Log Management", https://www.splunk.com/en_us/log-management.html, 7 pages, accessed Aug. 1, 2022.
"VMware vCenter Log Insight", http://www.vmware.com/ca/en/products/vcenter-tog-insight, 4 pages, accessed Aug. 1, 2022.
"Speed considerations", https://github.com/angr/angr-doc/blob/master/docs/speed.md, 4 pages, accessed Aug. 1, 2022.
"Equifax says cyberattack may have affected 143 million in the U.S.", https://www.nytimes.com/2017/09/07/business/equifax-cyberattack.html, 7 pages, accessed Aug. 1, 2022.
"Inside the cyberattack that shocked the US government", https://www.wired.com/2016/10/inside-cyberattack-shocked-us-government/, 17 pages, accessed Aug. 1, 2022.
"AWStats: Free real-time logfile analyzer to get advanced statistics", https//awstats.sourceforge.io/, 4 pages, accessed Aug. 1, 2022.
"The Rocket-Fast System For Log Processing", http://www.rsyslog.com/, 2 pages, accessed Aug. 1, 2022.
Abreu et al., "Diagnosing Advanced Persistent Threats: A Position Paper", Proceedings of the 26th International Workshop on Principles of Diagnosis, pp. 193-200.
Aguilera et al., "Performance debugging for distributed systems of black boxes", ACM SIGOPS Operating Systems Review, vol. 37, No. 5, pp. 74-89, Oct. 2003.
Barham et al., "Using magpie for request extraction and workload modelling." in OSDI, 21 pages, 2004.
Bates et al., "Transparent web service auditing via network provenance functions", in World Wide Web Conference, pp. 887-895, Apr. 2017.
Bates et al., "Trustworthy wholesystem provenance for the linux kernel", in Proceedings of the 24th USENIX Conference on Security Symposium, pp. 319-334, Aug. 2015.
Muniswamy-Reddy et al., "Provenance-aware storage systems", in Proceedings of the Annual Conference on USENIX '06 Annual Technical Conference, pp. 43-56, 2006.
Cantrill et al., "Dynamic instrumentation of production systems", in USENIX ATC, 18 pages, 2004.
Costin et al., "A large-scale analysis of the security of embedded firmwares", in USENIX Security Symposium, 17 pages, Aug. 20-22, 2014.
Crosby et al., "Efficient data structures for tamper-evident logging", in USENIX Security Symposium, 17 pages, 2009.
Ding et al., "Log2: A cost-aware logging mechanism for performance diagnosis", in USENIX Annual Technical Conference, 13 pages, Jul. 8-10, 2015.
Erlingsson et al., "Fay: Extensible distributed tracing from kernels to clusters", ACM Transactions on Computer Systems, vol. 30, No. 4, Article 13, 35 pages, Nov. 2012.
Fonseca et al., "X-trace: A pervasive network tracing framework", in NSDI, USENIX, 20 pages, 2007.

(56) References Cited

OTHER PUBLICATIONS

Fu et al., "Where do developers log? an empirical study on logging practices in industry", in ICSE Companion, ACM, May 31-Jun. 7, 24 pages, 2014.

Fu et al., "Execution anomaly detection in distributed systems through unstructured log analysis", in International Conference on Data Mining, IEEE, 10 pages, 2009.

Gehani et al., "SPADE: Support for provenance auditing in distributed environments", in Middleware, 20 pages, 2012.

Gerhards, R., "The syslog protocol", Internet Requests for Comments, RFC 5424, 38 pages, Mar. 2009.

Gessiou et al., "Towards a universal data provenance framework using dynamic instrumentation", in Information Security and Privacy Research, D. Gritzalis, S. Furnell, and M. Theoharidou, Eds. Springer Berlin Heidelberg, 12 pages, 2012.

Goater, C., "Log4c: Logging for C Library", [Online], Available: http://log4c.sourceforge.net/, 3 pages, accessed Aug. 1, 2022.

Hassan et al., "NoDoze: Combatting threat alert fatigue with automated provenance triage", in Network and Distributed Systems Security Symposium, 15 pages, Feb. 24-27, 2019.

Hassan et al., "Towards scalable cluster auditing through grammatical inference over provenance graphs", in network and Distributed Systems Security Symposium, 15 pages, Feb. 18-21, 2018.

Hossain et al., "SLEUTH: Real-time attack scenario reconstruction from COTS audit data", in 26th USENIX Security Symposium, 19 pages, 2017.

Ji et al., "Rain: Refinable attack investigation with on-demand inter-process information flow tracking", in CCS, ACM, 14 pages, Oct. 30-Nov. 3, 2017.

Ji et al.,"RecProv: Towards Provenance-Aware User Space Record and Replay", Lecture Notes in Computer Science, pp. 3-15, Jun. 2016.

King et al., "Backtracking intrusions", in SOSP, ACM, 14 pages, Oct. 19-22, 2003.

King et al., "Enriching intrusion alerts through multi-host causality", in NDSS, 12 pages, 2005.

King, J.C., "Symbolic execution and program testing", Communications of the ACM, vol. 19, No. 7, 10 pages, Jul. 1976.

Kwon et al., "MCI: Modeling-based causality inference in audit logging for attack investigation", in Network and Distributed Systems Security Symposium, 15 pages, Feb. 18-21, 2018.

Lee et al., "High accuracy attack provenance via binary-based execution partition", in NDSS, 16 pages, 2013.

Ma et al., "Protracer: Towards practical provenance tracing by alternating between logging and tainting", in NDSS, 15 pages, Feb. 21-24, 2016.

Ma et al., "Accurate, low cost and instrumentation-free security audit logging for Windows", in ACSAC, ACM, 10 pages, Dec. 7-11, 2015.

Ma et al., "MPI: Multiple perspective attack investigation with semantic aware execution partitioning", in The Proceedings of the 26th USENIX Security Symposium, 19 pages, Aug. 16-18, 2017.

Mace et al., "Pivot tracing: Dynamic causal monitoring for distributed systems", in SOSP, ACM, 16 pages, Oct. 4-7, 2015.

Meng et al., "Divide and conquer: recovering contextual information of behaviors in android apps around limited-quantity audit logs", in International Conference Ssoftware Engineering: Companion Proceedings (ISCE Companion), IEEE Press, 2 pages, 2019.

Milajerdi et al., "HOLMES: Real-time APT detection through correlation of suspicious information flows", in symposium on Security and Privacy, IEEE, pp. 1137-1152, 2019.

Montanari et al., "Evidence of log integrity in policy-based security monitoring", in DSN, IEEE, 6 pages, 2012.

Muniswamy-Reddy et al., "Layering in provenance systems", in ATC, 14 pages, 2009.

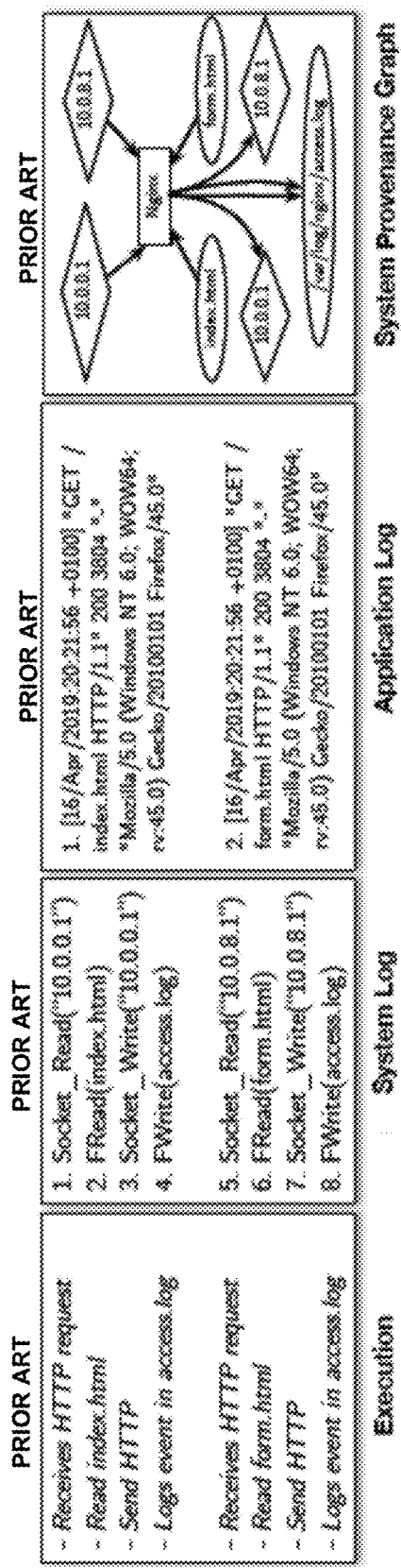
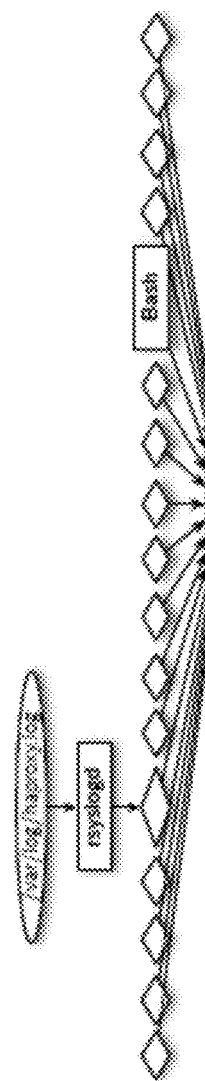
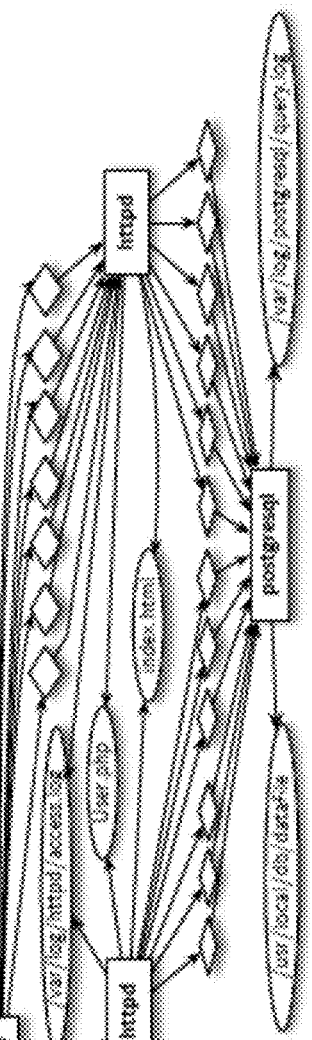
FIG. 2A  FIG. 2B  FIG. 2C  FIG. 2D
FIG. 3

```
/* /src/networking.c */
while(...) { //EVENT HANDLING LOOP
    /* Wait for TCP connection */
    cfd = anetTcpAccept(server.neterr, fd, cip, sizeof(cip), &cport);
    serverLog(LL_VERBOSE,"Accepted %s:%d", cip, cport);
    .../*Process request here*/
    serverLog(LL_VERBOSE,"Client closed connection");}
```

FIG. 5A — Redis

```
sshpam_err = pam_set_item(sshpam_handle, PAM_CONV,
                          (const void *)&passwd_conv);
if (sshpam_err != PAM_SUCCESS)
    fatal("PAM: %s: failed to set PAM_CONV: %s", __func__,
          pam_strerror(sshpam_handle, sshpam_err));
sshpam_err = pam_authenticate(sshpam_handle, flags);
sshpam_password = NULL;
if (sshpam_err == PAM_SUCCESS && authctxt->valid) {
    debug("PAM: password authentication accepted for %.100s",
          authctxt->user);
    return 1;
} else {
    debug("PAM: password authentication failed for %.100s: %s",
          authctxt->valid ? authctxt->user : "an illegal user",
          pam_strerror(sshpam_handle, sshpam_err));
    return 0;
}
```

FIG. 5C — OpenSSH

```
/* /src/backend/tcop/postgres.c */
static void exec_simple_query(const char *query_string){
    errmsg("statement: %s", query_string);
    ...
}
void PostgresMain(int argc, char *argv[],....){
    ...
    for(;;) { //EVENT HANDLING LOOP
        ...
        exec_simple_query(query_string);
        ...}}
```

FIG. 5B — PostgreSQL

Algorithm 1: Program Code Analysis

Func GETLMS(*Binary B, Log functions F*)
    /* Overall process to build the LMS paths */
    $g \leftarrow$ ANGRGETFASTCFG($B$)
    $C \leftarrow$ EXTRACTCALLSITES($g, \mathcal{F}$)
    /* Concretization step */
    $\mathcal{V} \leftarrow$ PEEPHOLECONCRETIZATION($g, C$)
    /* Building the LMS paths step */
    $\mathcal{G} \leftarrow$ BUILDLMSPATHS($g, \mathcal{V}, \mathcal{F}$)

Func EXTRACTCALLSITES(*cfg, F*)
    $C \leftarrow \emptyset$
    foreach *basic block* $b \in cfg$ do
        /* Check if the basic block jumps into a logging function */
        if $b.jump\_target\_address \in \mathcal{F}.addresses$ then
            $C \leftarrow C \cup \{b\}$
        end
    end
    return $C$

Func PEEPHOLECONCRETIZATION(*cfg, call_sites, maxBackTrace*)
    $\mathcal{V} \leftarrow \emptyset$
    $V \leftarrow \{(b,0) \text{ for } b \in call\_sites\}$
    while $V \neq \emptyset$ do
        $(b, backtrace) \leftarrow V.pop()$
        /* $L$ is of the form $\{(LMS \ \ell, call\_stack \ cs)\}$ */
        $L \leftarrow$ SYMBOLICEXECUTION($g, v$)
        if $L \neq \emptyset$ then
            foreach $(\ell, cs) \in L$ do
                /* Taking care of context sensitivity */
                $topBlock \leftarrow cs.top()$
                if $(\ell, topBlock) \notin \mathcal{V}$ then
                      $\mathcal{V} \leftarrow \mathcal{V} \cup \{(\ell, topBlock)\}$
                end
            end
        end
        else if $backtrace \leq maxBackTrace$ then
            $V \leftarrow V \cup \{(v, backtrace + 1) \text{ for } v \in b.predecessors()\}$
        end
    end
    return $\mathcal{V}$

Func BUILDLMSPATHS(*cfg, V, F*)
    /* $\mathcal{E}$ is the set of paths between LMS */
    $\mathcal{E} \leftarrow \emptyset$
    foreach $f \in cfg.functions() \setminus \{\mathcal{F}\}$ do
        /* Extract the entry points and external returns */
        $entries \leftarrow f.entry\_points()$
        $returns \leftarrow f.jumps()$
        $\mathcal{E} \leftarrow \mathcal{E} \cup$ GETLOCALPATHS($\mathcal{V}, f$)
    end

FIG. 8

```
log("Server started"); // log1
while(...) {
  log("Accepted Connection"); // log2
  ... /*Handle request here*/
  log("Closed Connection"); // log3
}
log("Server stopped"); // log4
```

FIG. 9A

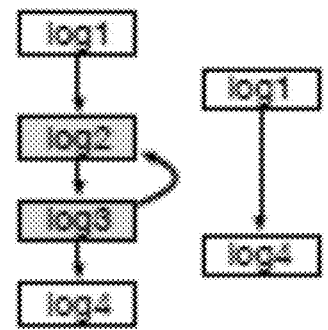

FIG. 9B

Algorithm 2: UPG Construction

Inputs: Universal log file $L_{uni}$;
Symptom event $e_s$;
LMS control flow paths $Paths_{lms}$;

Output: Backward universal provenance graph $G$

Variables: $LMS_{state}$ ← Current state of LMS;
$eventUnit[Pid]$ ← events in current unit related to $Pid$;
$endUnit$ ← flag to partition execution into unit;

$endUnit \leftarrow false$
foreach event $e \in L_{uni}$ happened before $e_s$ do
  if IsAppEntry(e) then
    $LMS_{cand}$ = GetLMSRegex(e)
    $endUnit$ = MatchLMS($LMS_{cand}$, $Paths_{lms}$, $LMS_{state}$, $eventUnit[Pid_e]$, $L_{uni}$)
  end
  if $endUnit$ then
    $eventUnit[Pid_e]$.add(e)
    Add all events from $eventUnit[Pid_e]$ to $G$
    $endUnit \leftarrow false$
    $eventUnit[Pid_e] \leftarrow null$
  end
  else
    $eventUnit[Pid_e]$.add(e)
  end
end
return $G$

FIG. 10

TRANSPARENT INTERPRETATION AND INTEGRATION OF LAYERED SOFTWARE ARCHITECTURE EVENT STREAMS

RELATED APPLICATIONS

This application claims the benefit under 35 U.S.C. § 119(e) of U.S. Provisional Patent Application No. 62/940,114, filed Nov. 25, 2019, which is incorporated herein by this reference in its entirety.

FEDERALLY SPONSORED RESEARCH OR DEVELOPMENT

This disclosure was made with government support under SaTC-1750024 and SaTC-1657534 awarded by the National Science Foundation. The government has certain rights in the invention.

BACKGROUND

System intrusions are progressively becoming more subtle and complex. Exemplified by the "low and slow" attack strategy of Advanced Persistent Threats (APTs), attackers now lurk in the system for extended periods to extend their reach before initiating a devastating attack. By avoiding actions that would immediately arouse suspicion, the dwell time for such attackers can range from weeks to months, as was the case in numerous high-profile data breaches including Target, Equifax, and the Office of Personnel Management (U.S. Government).

Against such odds, advancements in system auditing have proven invaluable to detecting, investigating, and ultimately responding to threats. The notion of data provenance has been applied to great effect on traditional system audit logs, parsing individual system events into provenance graphs that encode the history of a system's execution. The term provenance refers to the place of origin or earliest known history or source of something, in this case causal execution events. These provenance graphs allow investigators to trace the root-cause and ramifications of an attack using causality analysis. Leveraging this principle capability, causality analysis has matured from a costly offline investigation tool to a highly-efficient method of tracing attackers in real time and is now even being incorporated into runtime security monitors.

BRIEF DESCRIPTION OF THE DRAWINGS

A more particular description of the disclosure briefly described above will be rendered by reference to the appended drawings. Understanding that these drawings only provide information concerning typical embodiments and are not, therefore, to be considered limiting of its scope, the disclosure will be described and explained with additional specificity and detail through the use of the accompanying drawings.

FIG. 2A is a flow diagram illustrating execution behavior of NGINX web server while serving two different Hypertext Transfer Protocol (HTTP) requests according to an embodiment.

FIG. 2B is a diagram illustrating system logs generated by kernel-level provenance tracker according to an embodiment.

FIG. 2C is a diagram illustrating application event logs generated by NGINX web server according to an embodiment.

FIG. 2D is a system provenance graph generated using system logs by conventional solutions according to an embodiment.

FIG. 3 is a whole-system provenance graph describing SQL injection (SQLi) attack scenario according to various embodiments.

FIGS. 5A, 5B, 5C are code snippets illustrating logging behavior of different applications inside an event-handling loop, respectively from Redis, PostgreSQL, and OpenSSH.

FIG. 8 is pseudo-code of processes (Algorithm 1) describing program code analysis of application event logs and creation of log message string control flow paths according to various embodiments.

FIGS. 9A and 9B are, respectively, a code snippet and a flow chart illustrating Log Message Strings (LMS) control flow paths representation of the code snippet according to an embodiment.

FIG. 10 is pseudo-code of processes (Algorithm 2) describing UPG generation according to various embodiments.

DETAILED DESCRIPTION

Figure 1:
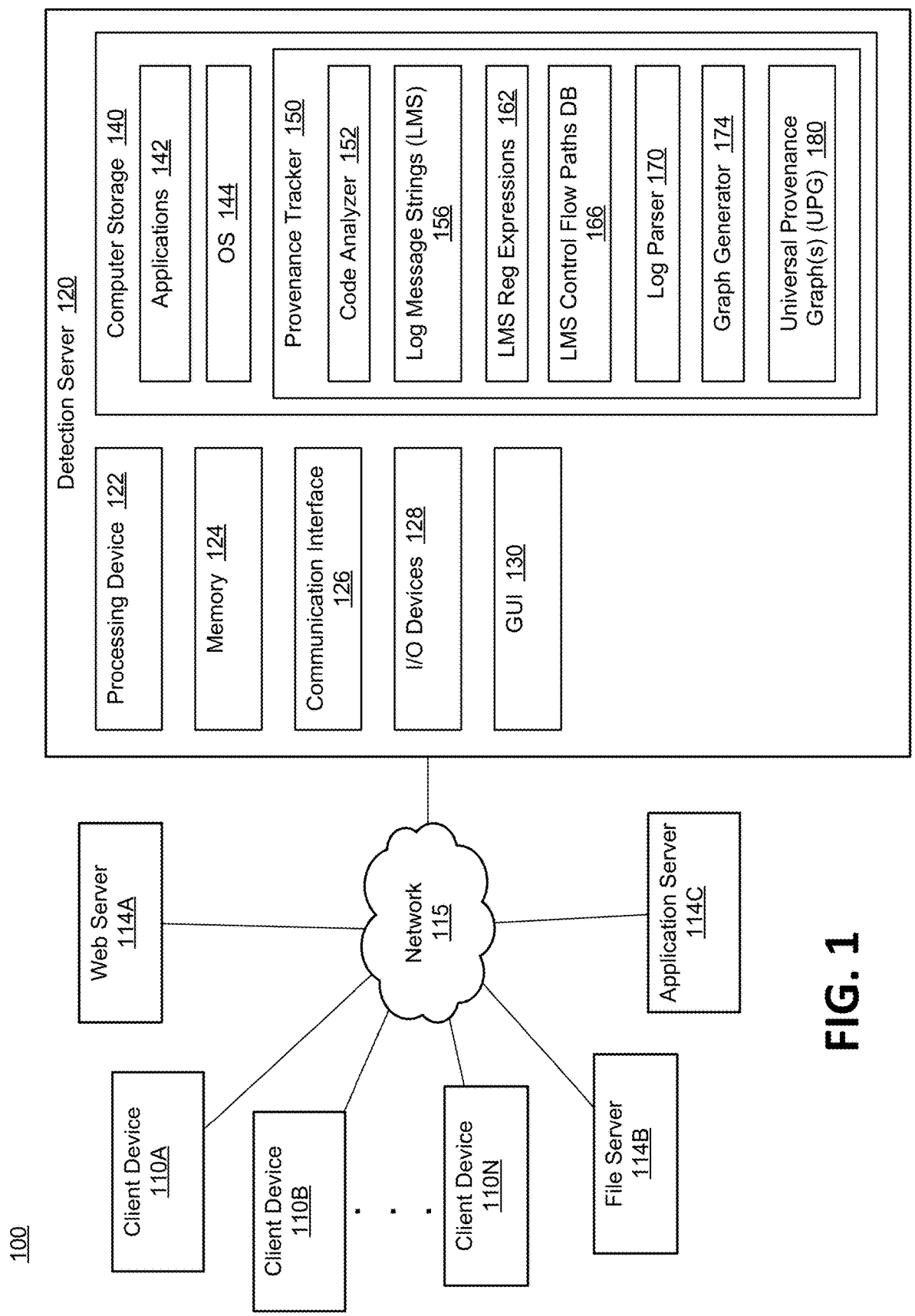
FIG. 1 is an example system in which a detection server is networked to multiple resource servers and client devices according to various embodiments.

Recent advances in causality analysis have enabled investigators to trace multi-stage attacks using whole-system provenance graphs. Based on system-layer audit logs (e.g., syscalls), these approaches omit vital sources of application context (e.g., email addresses, HTTP response codes, and the like) that can be found in higher layers of the system. Although this information is often essential to understanding attack behaviors, incorporating this evidence into causal analysis engines is difficult due to the semantic gap that exists between system layers.

To address this shortcoming, this disclosure describes a mechanism for transparently recognizing and combining causal dependencies from various application event logs in layered software systems in order to create a Universal Provenance Graph (UPG). In various embodiments, the UPG can encode forensically relevant causal dependencies regardless of layer of origin within the layered software systems. Layered software can be understood to include various software layers, each of which corresponds to a different service or integration, and may include layers between client and server in networked computing architecture.

To transparently achieve this creation of the UPG on commodity software, a provenance-tracking mechanism, executable within existing systems, is introduced that bridges the semantic gap between system and application logging contexts. A provenance profiling mechanism analyzes program code (e.g., source code, binary code) of one or more applications to identify and model application-layer logging behaviors, enabling application events to be accurately reconciled with system-layer accesses. A provenance aggregation mechanism can then intercept runtime logging activities of these applications and graft those events onto the system-layer provenance graph, allowing investigators to reason more precisely about the nature of attacks. Such provenance tracking is widely-applicable to existing software projects and can transparently facilitate execution partitioning of dependency graphs without training or developer intervention. Evaluation on real-world attack scenarios shows that the resulting Universal Provenance Graphs (UPGs) are concise and rich with semantic information as compared to the state-of-the-art, with 4% average runtime overhead.

Given the importance of threat investigation to system defense, it is perhaps surprising that prior work on causality analysis is largely oblivious to application-layer semantics. As an example, consider the execution of the web service shown in FIGS. 2A-2D. FIG. 2A is a flow diagram illustrating the execution behavior of NGINX while serving two different HyperText Transfer Protocol (HTTP) requests according to an embodiment. NGINX is an open source HTTP Web server.

In an embodiment, FIG. 2A describes the event sequence of the example, in which the server responds to two HTTP requests for index.html and form.html, respectively, yielding the system log shown in FIG. 2B. As a normal part of its execution, the server also maintains its own event logs that contain additional information (e.g., user-agent strings) shown in FIG. 2C, which is opaque to the system layer. State-of-the-art causality analysis engines, using system audit logs, produce a conventional provenance graph similar to that illustrated in FIG. 2D. However, the forensic evidence disclosed by the application itself is not encoded in the graph of FIG. 2D. This is unfortunate, as recent studies have shown that application developers explicitly disclose the occurrence of important events through application logging. Further, the well-studied problem of dependency explosion, which considers the difficulty of tracing dependencies through high-fan-out processes, is itself a result of unknown application semantics. For example, the dependency graph in FIG. 2D is not aware that the NGINX vertex can be subdivided into two autonomous units of work (e.g., functional components), marked by the two HTTP requests found in the application event log.

Prior work on log analysis does not provide a generic and reliable (i.e., causality-based) solution to cross-layer attack investigation. Techniques for execution partitioning mitigate the dependency explosion problem by identifying limited and coarse-grained application states, e.g., when a program starts its main event-handling loop, but requires invasive instrumentation or error-prone training. Past frameworks for layered provenance tracking technically support application semantics, but rather than harness the developer's original event logs instead call for costly (and redundant) instrumentation efforts. Elsewhere in the literature, application event logs have been leveraged for program debugging, profiling, and runtime monitoring; however, these approaches are application-centric, considering a single application's siloed event logs at a time, and thus cannot reconstruct complex workflows between multiple processes. Attempts to "stitch" application logs together to trace multi-application workflows commonly ignore the system layer, but also use ad-hoc rules and co-occurrence of log events to assume a causal relationship, but this assumption introduces error and could potentially undermine threat investigation.

It is described in this disclosure that attack investigation capabilities would be dramatically improved through the unification of forensically-relevant events on the system in a single holistic log. To transparently and effortlessly achieve such a holistic log on present commodity systems, disclosed is an end-to-end provenance tracker that merges application event logs with the system log to generate a UPG. This graph combines the causal reasoning strengths of whole-system logging with the rich semantic context of application event logs. To generate the UPG, the provenance tracker automatically parses dispersed, intertwined, and heterogeneous application event log messages at runtime and associates each record with the appropriate system-layer graph components, e.g., system log, in the whole-system provenance graph. Leveraging this insight, the provenance tracker can transparently solve both the dependency explosion problem (by identifying event handling loops through the application event sequences) and the semantic gap problem (by grafting application event logs onto the whole-system provenance graph). Further, the provenance tracker does not require modification or instrumentation on the applications or underlying system to function.

Several challenges exist in the design of a provenance analysis system that operates on audit event streams from multiple software layers. First, the ecosystem of software logging frameworks is heterogeneous (e.g., diverse in character or content) and event logging is fundamentally similar to any other file input/output (I/O), making it difficult to automatically identify application logging activity. Second, event logs are regularly multiplexed across multiple threads in an application, making it difficult to differentiate concurrent units of work. Finally, each unit of work (e.g., functional component) in an application can generate many events whose occurrence and ordering vary based on the dynamic control flow, requiring a deep understanding of the application's logging behavior to identify meaningful boundaries for execution unit partitioning.

At least some aspects of the present disclosure address the above and other deficiencies through the disclosed provenance tracker that performs analysis on program code (e.g., e.g., source code, binary code, or the like compiled code) to identify log message writing procedures, using symbolic execution and emulation to extract descriptive log message strings (LMS) for each of multiple call sites. To perform symbolic execution, instead of supplying the normal inputs to a program (e.g. numbers) a system supplies symbols representing arbitrary values. The execution proceeds as in a normal execution except that values can be symbolic formulas over the input symbols.

In further embodiments, the provenance tracker performs control flow analysis on the program code to identify the temporal relationships between the LMS, generating a set of valid LMS control flow paths that occur during execution. At runtime, the provenance tracker identifies (or captures) log event messages emitted by the application. The provenance tracker can further add, to the respective event messages, using an instrumented code library, one of a process identifier (PID) or a thread identifier (PID) (e.g., PIDs of a process and/or TIDs of a process-thread that generate the log event messages) and a timestamp to generate process-specific event log messages, which can aid in future reconciliation with the system-level logs. Finally, these augmented, or process-specific event logs can be merged with system-level logs into a universal log file. In other words, the provenance tracker can associate the system logs with corresponding process-specific event log messages with in the universal log file using one or more of the PID, the TID, or the timestamp of the process-specific event log messages.

Upon attack investigation, the provenance tracker is able to use the LMS control flow paths to parse the flattened stream of applications events in the universal log file, partition application events into execution units, and finally add the application events as vertices within the whole-system provenance graph that provide log-based context to system events. Unlike past approaches to multi-log analysis, the provenance tracker is able to assure that these associations are causally correct based on the system-layer information flows captured at runtime.

Providing these resolutions to the above-enumerated deficiencies includes a number of advantages that will be detailed throughout this disclosure. For example, the concept of the Universal Provenance Graph (UPG) combines the advantages of whole-system provenance with the innate event logging activity of applications, providing a transparent and universally-applicable solution to semantic gap problems in threat investigations. Disclosed robust program code analysis techniques can extract logging behaviors from program code, enabling correspondence association to the whole-system provenance.

FIG. 1 is an example system 100 in which a detection server 120 is networked to multiple resource servers and client devices according to various embodiments. For example, the system 100 can include multiple client devices 110A, 110B, . . . 110N, a Web server 114A, a file server 114B, an application server 114C, and other computing devices and online services accessible over and communicatively coupled to the detection server 120 over a network 115.

In various embodiments, the network 115 is one or a combination of a local area network (LAN), a wide area network (WAN), and a wireless local area network (WLAN), which can include WLAN or other types of hotspots. The WLAN hotspots can be created by Wi-Fi® products based on IEEE 802.11x standards by Wi-Fi Alliance, for example. Another wireless communication system can be a wireless carrier system that can be implemented using various data processing equipment, communication towers, and the like. While illustrated as a single server, the detection server 120 and its processing resources can be distributed across more than one physical computing system that is accessible to the network 115. In one embodiment, the detection server 120 is located in the cloud.

For exemplary purposes, the detection server 120 can include, but not be limited to, one or more processing device 122, a memory 124, a communication interface 126, one or more I/O devices 128, a graphical user interface (GUI) 130, and a computer storage 140. The computer storage 140 can store, among other code, instructions, and data, one or more applications 142, an operating system 144, which includes a kernel and on which the one or more applications 142 can be executed, and a provenance tracker 150. The computer storage 140 can also include part or all of the GUI 130, which is executable by the processing device 122. In some embodiments, the provenance tracker 150 includes but is not limited to, a code analyzer 152, log message strings (LMS) 156, LMS regular expressions 162, an LMS control flow paths database 166 in which to store LMS control flow paths, a log parser 170, a graph generator 174, and universal provenance graph(s) (UPG) 180.

In an exemplary embodiments, the provenance tracker 150, when executed by the one or more processing device 122 and the memory 124, analyzes program code, including a control flow graph, of the one or more applications 142 executable by the operating system 144 of a computing device (e.g., of the detection server 120) to determine event-logging functions of the program code that generate event logs. The provenance tracker 150 further extracts the log message strings (LMS) 156 from the program code that describe event-logging statements associated with the event-logging functions. The provenance tracker 150 further generates the LMS regular expressions 162 from the LMS 156, the LMS regular expressions including a template format of the log message strings that replace format specifiers with runtime-dependent arguments, for example. The provenance tracker 150 further identifies, via control flow analysis, multiple possibilities of the LMS control flow paths of the LMS 156 through the control flow graph. The provenance tracker 150 can store the LMS control flow paths in the LMS control flow paths DB 166. These initial program code analytics and extractions can be performed offline and via symbolic execution of the program code, among other techniques that will be discussed. In other embodiments, these initial program code analytics and extractions are performed dynamically during application execution, or a combination of static and dynamic analysis.

In these exemplary embodiments, the provenance tracker 150 further generates, during runtime execution of the program code on the computing device, a universal log file from a combination of system logs (e.g., from a whole-system provenance graph) and process-specific event log messages of the one or more applications. In some embodiments, the runtime execution of a file system and/or operating system and one or more applications 142 is performed on one of the client devices 110A . . . 11N, the Web server 114A, the file server 114B, the application server 114C, or other networked computing device, and is tracked remotely by the provenance tracker 150.

The provenance tracker 150 further identifies, via the log parser 170 parsing the universal log file, log entries that most closely match one or more of the LMS regular expressions 162 of the log message strings (LMS) 156, to identify matching LMS entries. The provenance tracker 150, e.g., the graph generator 174, further adds the matching LMS entries, using a process-specific identifier of each matching LMS entry, to generate a UPG 180 that associates the matching LMS entries with the system logs consistent with the multiple possible LMS control flow paths of the LMS 156. The UPG 180 can be stored in the computer storage 140 and made accessible to an administrator ("admin") or other user via the GUI 130. In some embodiments, the UPG 180 is an integrated-layered causal dependency graph in which the possible control flow paths of the log message strings of the one or more applications 142 are integrated within multiple layers of a whole-system provenance graph that include the system logs.

In some embodiments, event-annotated control flow graphs, such as the UPG 180, can be used to determine expected control flow actions. These expected control flow actions can in turn be compared to actual control flow events of the one or more applications during runtime to determine whether to trigger an alert due to a compromise in the execution of the one or more applications, as will be discussed in more detail with reference to FIG. 14.

In proof-of-concept implementations, the provenance tracker 150 non-intrusively collects and integrates event logs from applications with logs from the Linux audit framework's (auditd) system logs. Although Linux is referred to herein by way of example, the disclosed provenance tracker 150 is universally applicable to other types of operating systems. Now, consider a data exfiltration and defacement attack on an online shopping website as an example to illustrate the limitation of existing provenance tracking systems. Consider a simple WordPress website hosted on the Web server 114A. Requests to the website are first received by an HAProxy, which balances loads across different Apache instances running on the Web server 114A, while customer transactions are recorded in a PostgreSQL database. The administrator has turned on application event logging for Apache, HAProxy, and PostgreSQL. While Apache and PostgreSQL write event messages directly to a file, HAProxy uses the Syslog daemon (rsyslogd) for collecting log messages and writing to disk. Additionally, the server is performing kernel-level logging, e.g., through Linux Audit (auditd), which continuously collects system logs. One day, the administrator discovers that the online store has been defaced and that portions of sensitive customer information have been posted to a public Pastebin website. On average, the shopping website receives tens of thousands of requests per day; among those, one request was malicious.

To attribute the attack and prepare an appropriate response, the admin initiates a forensic inquiry by first inspecting the application event logs. The admin identifies that the accounts database table must have been accessed and uses this as a symptom to initiate an investigation. The admin then runs a grep query on PostgreSQL event logs, which returns the following query:

```
SELECT * FROM users WHERE user_id=123 UNION SELECT
    password FROM accounts;
```

This event strongly indicates that an attacker exploited a SQL injection (SQLi) vulnerability in the website, and also suggests that the attacker was able to retrieve the login credentials for admin.php which gave them privileged site access. At this point, the admin is unable to proceed in the investigation using application event logs alone. It is clear that the HAProxy and Apache logs contain important evidence such as the HTTP requests associated with the SQL injection attack, but re-running the same grep query on Apache's logs did not return any result; this is because the attacker used a POST command to send the SQL query, which was not contained in the URL captured in the NGINX Event log. The investigation has stalled with important questions left unanswered, such as: 1) What was the IP address associated with the malicious HTTP request? 2) How were the login credentials used to deface the website, and what additional damage was caused? 3) Which PHP file on the site is not properly sanitizing user inputs, exposing the SQL injection vulnerability? These questions reflect an inherent limitation of application event logs, which cannot causally relate events across applications and thus cannot trace workflow dependencies.

To proceed, the admin attempts to perform causality analysis using a whole-system, or system-level, provenance graph. At this layer, it is easy to trace dependencies across multiple coordinated processes in a workflow. Because the malicious query shown above resulted in a read to the PostgreSQL database, the administrator uses/usr/local/db/datafile.db as a symptom event and issues a back trace query, yielding the provenance graph shown in FIG. 3. Unfortunately, the admin discovers that this technique does not advance the investigation due to the inherent limitations of system logs.

The admin's backtrace identifies thousands of "root causes" for the SQL injection attack due to the dependency explosion problem because kernel-layer tracers conservatively assume that the output of a process is causally dependent on all preceding process inputs. Although the malicious query string is known, the causal analysis does not allow the admin to associate the query with a particular outbound edge of /usr/local/db/datafile.db in the provenance graph. Even if the admin restricted most of the dependencies between Apache httpd and PostgreSQL (e.g., though timing bounds), the admin would again face the same problem when identifying which input request from HAProxy to Apache httpd lies on the attack path.

Recent work has introduced execution partitioning as a viable solution to the dependency explosion problem. These systems decompose long-running processes into autonomous "units," each representing an iteration of some event-handling loop, such that input-output dependencies are only traced through their corresponding unit. Where event handling loops do not encode work units, some propose inference-based techniques for identifying units from system log traces, and also a framework for manually annotating source code to disclose unit boundaries.

TABLE 1

| | BEEP ProTracer | MPI | MCI | WinLog | Provenance Tracker 150 |
|---|---|---|---|---|---|
| Instrumentation | Yes | Yes | No | No | No |
| Training Run w/ Workloads | Yes | No | Yes | No | No |
| Space Overhead | Yes | Yes | Yes | Yes | No |
| Granularity | Coarse | Fine | Coarse | Coarse | Fine |
| App. Semantics | No | No | No | No | Yes |

Unfortunately, prior approaches suffer from noteworthy limitations, which we summarize in Table 1, which is a comparison of execution partition techniques to solve dependency explosion problem. Most execution partitioning systems rely on Instrumentation to identify unit boundaries, requiring either domain knowledge or manual effort and assuming the right to modify program binaries, which is not always available. The common requirement of Training Runs exposes systems like BEEP and ProTracer to the classic code coverage problem present in any dynamic analysis, and inference-based techniques (MCI) may additionally struggle with out-of-order events due to concurrent or cooperating applications during training runs. All past approaches introduce additional Space Overhead in order to track unit boundaries; fully-automated identification of event loops (BEEP, ProTracer) can generate excessive units that can waste space and CPU cycles. Most notably, prior approaches do not consider the broader value of Application Semantics as forensic evidence outside of the bare minimum required for the identification of work units.

Existing kernel-level provenance logs are beneficial in that they offer a broad view of system activity, but unfortunately, lack knowledge of application-specific behaviors that are pivotal for attack reconstruction. In the disclosed example, information such as failed login attempts, HTTP headers, WordPress plugins behavior, and SQL queries cannot be extracted from system logs. This information is present in the siloed events logs of each application; PostgreSQL maintained a record of all SQL queries, and HAProxy recorded the headers for all HTTP requests. However, it is not possible to reliably associate these event descriptions with the system records in a post-hoc manner. This is due to multi-threaded activity and ambiguous or incomplete information within the application event logs.

Prior work has sought to address this semantic gap problem through instrumentation-based techniques. These works either statically or dynamically instrument function calls in the application to disclose function names, arguments, and return values. However, these instrumentation-based systems suffer from several limitations: (1) developers need to specify which functions to instrument, imposing a domain knowledge requirement; (2) the logging information is captured at per-application basis and thus cannot be used to connect information flow between different applications; and (3) high-level semantic events may not always be effectively captured at the function call level.

Recent work in application logging have shown that efficacy of application logs in program understanding, debugging, and profiling. The disclosed provenance tracker 150 better leverages event logs during attack investigation. In various embodiments, applications developers have already done the hard work of encoding high-level application semantics in the form of event-logging statements. These events not only contain the relevant forensic information for use by the provenance tracker 150, but also mark the boundaries of execution units in the program or application. The insertion of event-logging statements is an organic byproduct of following sound software engineering practices, permitting developers and users to better understand runtime behavior of a program. Thus, it is possible to enrich system logs with application semantics without further instrumentation or profiling. Moreover, these applications logs can be used to identify semantic units or partition execution.

Figure 4A:
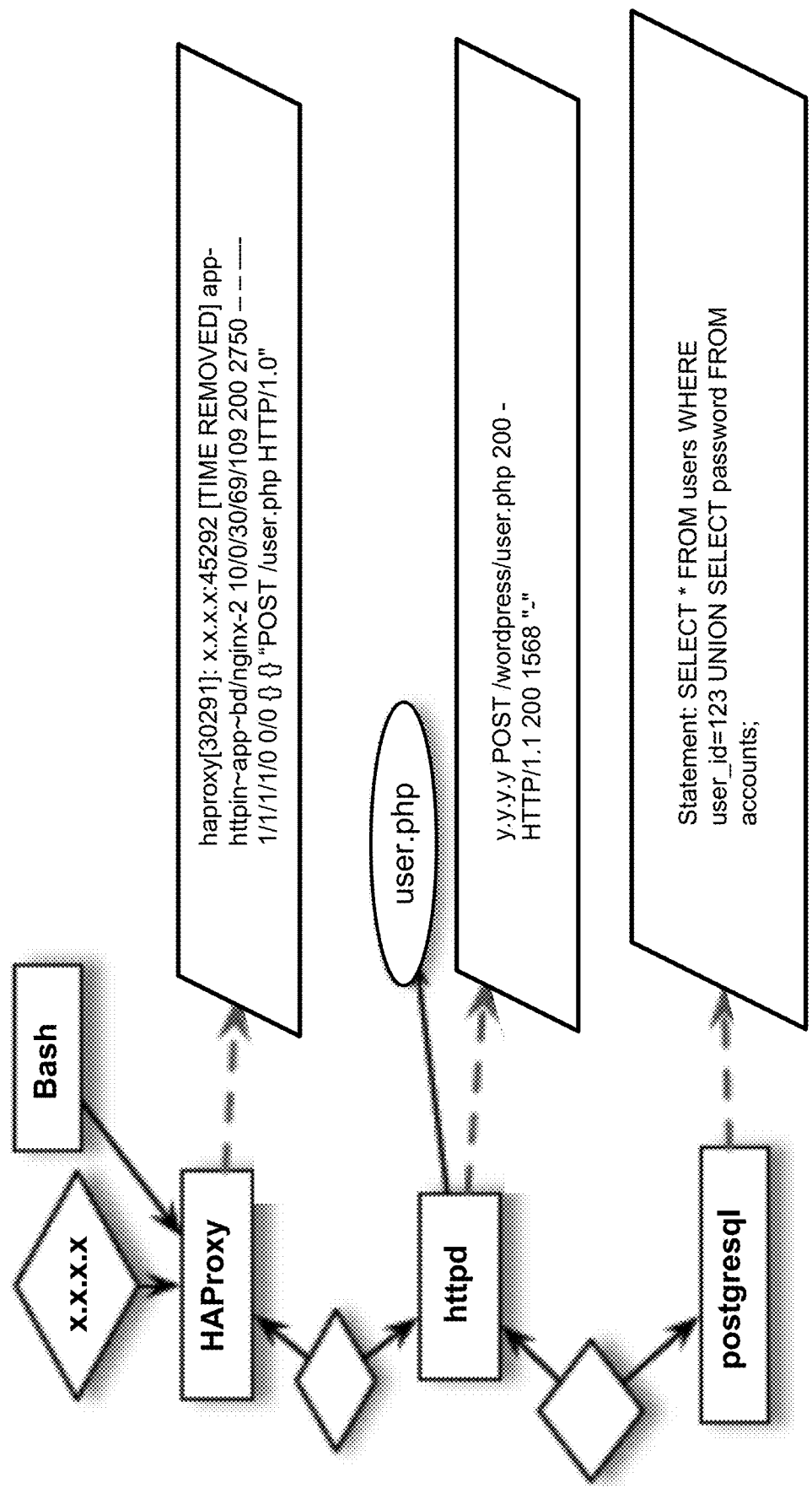
FIG. 4A is a Universal Provenance Graph (UPG) generated for an SQLi attack using SQL query that reads table accounts according to an embodiment.
Figure 4B:
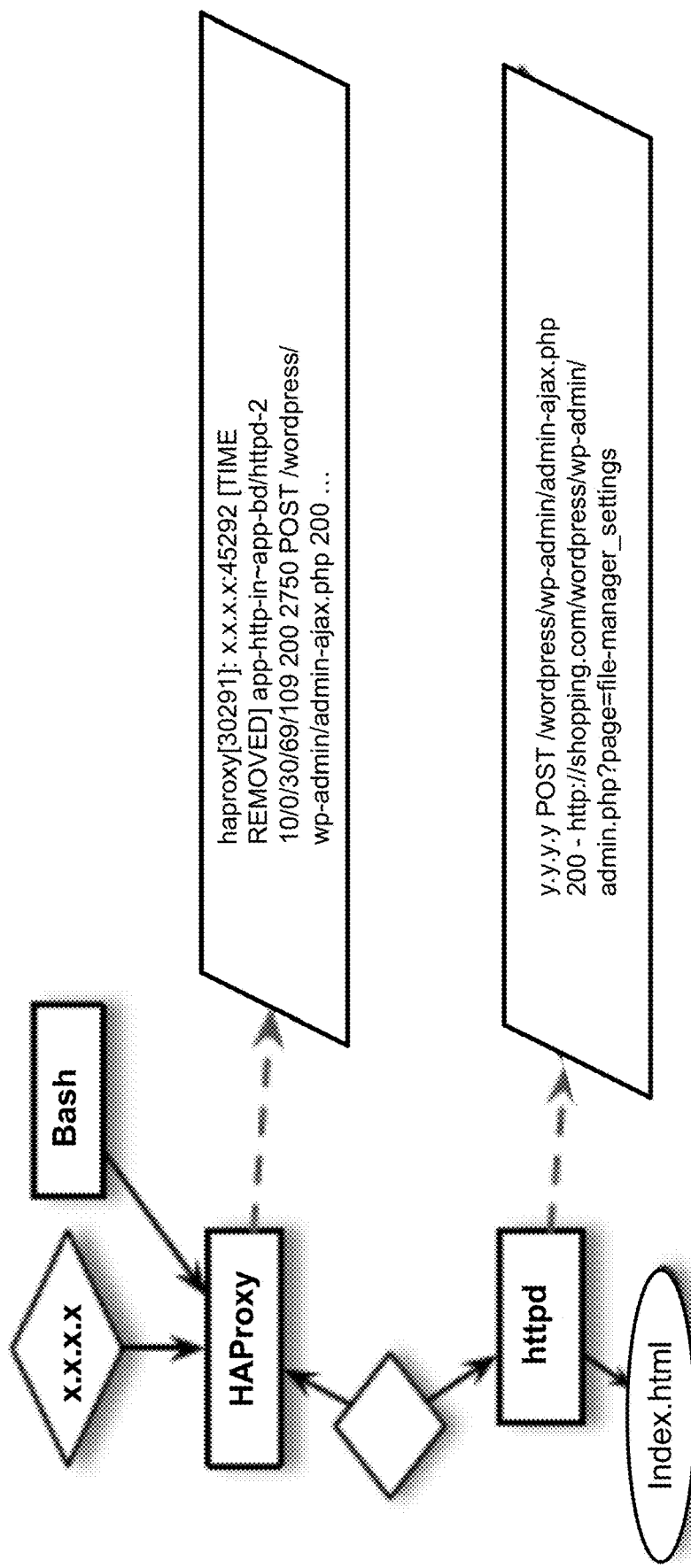
FIG. 4B is a UPG generated for an SQLi attack investigating website defacement using write event to index.html as a symptom according to an embodiment.

Applying this approach of integrating event-logging statements within the whole-system provenance graph to the above example scenario yields the provenance graph in FIG. 4A, which was generated using the provenance tracker 150. The admin can associate the malicious SQL query with a specific system call event (read). By performing execution partitioning on PostgreSQL using logging behavior analysis of the provenance tracker 150, the admin is able to trace back to system calls issued and received by Apache httpd, which are also annotated with application events describing the vulnerable web form. Iteratively, the provenance tracker 150 can use execution partitioning again to trace back to the correct unit of work within HAProxy to identify the Internet Protocol (IP) address of the attacker. After finding out how the user data and login credentials were stolen using SQL injection, the investigator tries to figure out how the website was defaced by issuing a backward tracing query on the index.html file. Using the provenance graph shown in FIG. 4B, as generated by the provenance tracker 150, the investigator deduces that the attacker used a WordPress file manager plugin to change index.html.

The present disclosure may consider an attacker whose primary goal is to exploit a security vulnerability in an application running on the system and exfiltrate or manipulate sensitive information present in the system. Typical assumptions are made for work in this space about the integrity of the operating system, kernel-layer auditing framework, and system log data on disk, all of which are in a trusted computing base (TCB). This assumption is made more reasonable through system hardening techniques designed to mitigate threats to system logs. Like prior work on execution partitioning, one may assume the integrity of control flows of applications. This is because violations to control flow integrity make it impossible to make assertions about a program's execution units; in the worst case where an application's control-flow integrity (CFI) is violated, it is possible to use the provenance tracker 150 on other applications in the attack path while falling back to traditional kernel-layer causal reasoning for the compromised application.

The disclosed approach to partition a long-running program into execution units and overcome the dependence explosion problem depends on the pervasiveness of event-logging behavior in those applications. In current art, the importance of logging in applications has been widely established. Practically, all open-source applications print event log messages, offering four levels of verbosity: FATAL is for an error that is forcing a shutdown, ERROR is for any error that is fatal to the operation, INFO is for generally useful information, and DEBUG is for information that is diagnostically helpful. Note that logging levels are inclusive; higher levels also print messages that be-long to lower levels, e.g., FATAL⊆ERROR⊆INFO⊆DEBUG.

However, to partition successful executions of an application into its units, the provenance tracker 150 can access log messages with verbosity level of INFO or DEBUG that are present inside event-handling loops. Unfortunately, such behavior in applications has not been investigated. In that regard, we studied a large number of popular open-source applications. We collected a list of 79 long-running Linux applications which belong to different categories. Those applications are written in the C/C++, Java, Python, and Erlang programming languages. We investigated the source code and main pages of those applications to identify the event-handling loops and understand if they print log messages for each meaningful event. We summarize our results in Table 2.

TABLE 2

|  | Category | Total Apps | Apps with Log Verbosity of | | | |
|---|---|---|---|---|---|---|
|  |  |  | IN + DE | INFO | DEBUG | None |
| Client-Server | Web server | 9 | 7 | 1 | 0 | 1 |
|  | Database server | 9 | 7 | 1 | 1 | 0 |
|  | SSH server | 5 | 5 | 0 | 0 | 0 |
|  | FTP server | 5 | 4 | 0 | 1 | 0 |
|  | Mail server | 4 | 3 | 1 | 0 | 0 |
|  | Proxy server | 4 | 3 | 1 | 0 | 0 |
|  | DNS server | 3 | 2 | 0 | 1 | 0 |
|  | Version control server | 2 | 0 | 1 | 1 | 0 |
|  | Message broker | 3 | 2 | 0 | 1 | 0 |
|  | Print server | 2 | 1 | 0 | 1 | 0 |
|  | FTP client | 6 | 0 | 1 | 4 | 1 |
|  | Email client | 3 | 1 | 0 | 1 | 1 |
|  | Bittorrent client | 4 | 3 | 1 | 0 | 0 |
|  | NTP client | 3 | 0 | 1 | 2 | 0 |
| GUI | Audio/Video player | 8 | 1 | 0 | 3 | 4 |
|  | PDF reader | 4 | 0 | 0 | 0 | 4 |
|  | Image tool | 5 | 0 | 0 | 1 | 4 |
| Total |  | 79 | 39 | 8 | 17 | 15 |

In the column "Apps with Log Verbosity of" are shown how many of 79 profiled applications include log statements in their event-handling loop at verbosity of INFO and DEBUG, and how many of the 79 applications do not print meaningful log messages for new events. We observe that 39 applications print log with both INFO and DEBUG verbosity levels (IN+DE) inside the event-handling loops, while 8 applications only log at INFO level, and 17 applications only log at DEBUG level. For Web servers such as lighttpd and NGINX, we treat the Access Log as INFO level log. Moreover, for certain applications that do not have DEBUG log level, we categorize the Trace Log as DEBUG level log. FIGS. 5A, 5B, 5C are code snippets illustrating logging behavior of different applications inside an event-handling loop, respectively from Redis, PostgreSQL, and OpenSSH, which are well-known applications.

During our study, we found 15 applications that do not have any information about event logs in their source code or in man pages. We categorized those applications as either light-weight applications or GUI applications. The light-weight applications include certain client-server applications designed to be light-weight to keep a minimal resource footprint. Those applications, which include thttpd (Web server) and skod (FTP client), do not print log messages for new events. We further observe that 12 out of 17 GUI applications either (1) do not print log messages, or (2) they print log messages that do not match the expectations of the forensic investigator. In other words, those log messages were not meaningful to partition the execution. Other published work also observes similar behavior for GUI applications where event-handling loops do not correspond to the high-level logic tasks. For example, we found that none of the Portable Document Format (PDF) readers in our study printed log messages whenever a new PDF file was opened. Such PDF file open event is forensically important event for threat investigations.

TABLE 3

| Program | Binary Size (kB) | Log Level inside EHL | Avg. Time (sec) | | Number of | | Completeness | |
|---|---|---|---|---|---|---|---|---|
|  |  |  | LMS | LMSPs | LMS | LMSPs | Callsites | Cov. % |
| Squid | 64,250 | IN + DE | 831 | 46 | 64 | 157,829 | 70 | 91 |
| PostgreSQL | 22,299 | IN + DE | 3,880 | 258 | 3,530 | 4,713,072 | 5,529 | 64 |
| Redis | 8,296 | INFO | 495 | 7 | 375 | 34,690 | 394 | 95 |
| HAProxy | 4,095 | IN + DE | 144 | 4 | 53 | 13,113 | 56 | 95 |
| ntpd | 3,503 | INFO | 2,602 | 4 | 490 | 10,314 | 518 | 95 |
| OpenSSH | 2,959 | IN + DE | 734 | 4 | 845 | 11,422 | 869 | 97 |
| NGINX | 2,044 | IN + DE | 775 | 11 | 923 | 8,463 | 925 | 100 |
| Httpd | 1,473 | IN + DE | 99 | 2 | 211 | 3,910 | 211 | 100 |
| Proftpd | 1,392 | IN + DE | 201 | 4 | 717 | 9,899 | 718 | 100 |
| Lighttpd | 1,212 | INFO | 1,906 | 2 | 349 | 5,304 | 358 | 97 |
| CUPSD | 1,210 | DEBUG | 1,426 | 3 | 531 | 4,927 | 531 | 100 |
| yafc | 1,007 | IN + DE | 88 | 2 | 57 | 3,183 | 60 | 95 |
| Transmission | 930 | IN + DE | 102 | 2 | 178 | 5,560 | 227 | 78 |
| Postfix | 900 | INFO | 97 | 3 | 96 | 2,636 | 98 | 98 |
| memcached | 673 | IN + DE | 193 | 7 | 64 | 19,510 | 69 | 93 |
| wget | 559 | INFO | 200 | 3 | 84 | 3,923 | 275 | 31 |
| thttpd | 105 | N/A | 157 | 8 | 4 | 14,847 | 5 | 80 |
| skod | 47 | N/A | 12 | 0 | 25 | 115 | 25 | 100 |

Our study suggests that sufficient logging information is present inside the event-handling loops of long-running applications. This behavior allows the provenance tracker 150 to identify the unit boundaries of those programs or applications. For further evaluation, we only consider the applications shown in Table 3. We picked those applications based on their popularity and category. Note that we did not pick any subjects from the category of applications that do not print meaningful log messages for new events.

In various embodiments, a whole-system provenance graph is a graph generated from system-level audit logs where the vertices in the graph represent the system subject, such as processes and system objects, including files and socket connection, while the edges between these subjects/objects represent a causal dependency event. These edges are usually annotated with a timestamp of the event and type of event such as read and execute.

In various embodiments, forensic investigators use the whole-system provenance graph to find the root-cause and ramifications of an attack by performing backward and forward causality analysis on the graph respectively. Given a symptom of an attack, an investigator can issue a backward tracing query on the whole-system provenance graph, which returns the root-cause of the attack by traversing the ancestry of the symptom event. The investigator can also issue a forward tracing query, which starts from the root-cause identified in the previous query and return all the causally connected events in the progeny of the root-cause, thus explaining the ramifications of the attack.

In the various embodiments, the provenance graph should preserve the following three properties of causality analysis. 1) Validity—the provenance graph should describe the correct execution of the system, e.g., the provenance graph should not add an edge between entities which are not causally related. 2) Soundness—the provenance graph should respect the happens-before relationship during backward and forward tracing queries. 3) Completeness—the provenance graph should be self-contained and fully explain the relevant event (or symptom).

The disclosed threat investigation solution is to be aware of the high-level semantic events that occurred within contexts of each attack-related application. The disclosed provenance tracker is to be immediately deployable on a broad set of applications commonly found in enterprise environments. Therefore, the solution does not depend on instrumentation or developer annotations. Moreover, disclosed techniques are to be agnostic to system architecture of applications and apply to proprietary software where source code is usually not available. Any modifications made by the provenance tracker to the whole-system provenance graph is to support existing causal analysis queries and preserve the properties of validity, soundness, and completeness.

Figure 6:
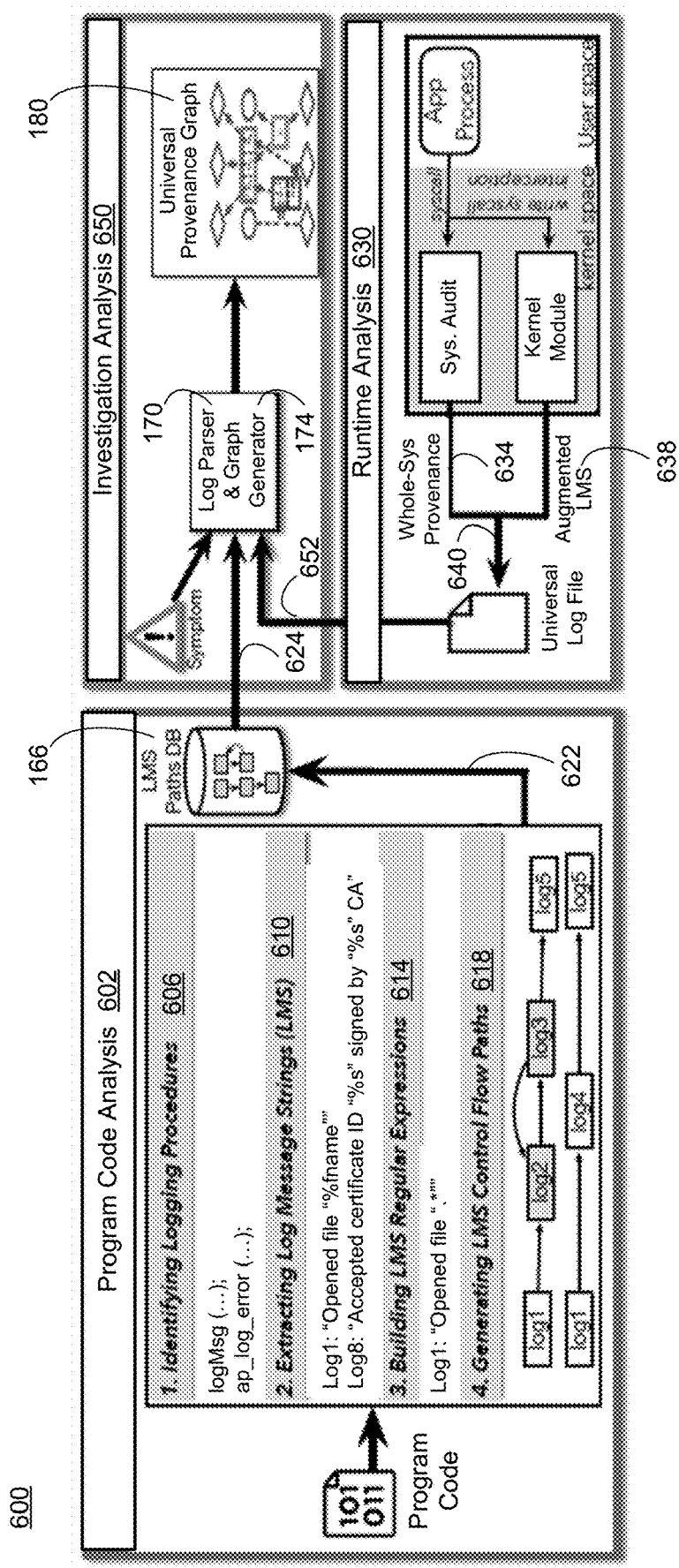
FIG. 6 is a system architecture overview of program code analysis, runtime analysis, and investigation analysis of code execution according to various embodiments.

FIG. 6 is a system architecture 600 overview of program code analysis 602, runtime analysis 630, and investigation analysis 650 of code execution according to various embodiments. FIG. 6 presents a high-level overview of the functionality of the provenance tracker 150, which calls for both system-level logging and application event logging be enabled. The provenance tracker 150 functionality is divided into these three phases, namely program code analysis 602, runtime analysis 630, and investigation analysis 650.

In various embodiments, in the program code analysis 602, and starting at operation 606, the provenance tracker 150 can first analyze program code of one or more applications to first determine or identify event-logging functions (or procedures) of the program code that generate event logs. At operation 610, the provenance tracker 610 can extract log message strings (LMS) that describe event logging statements in the code, e.g., that are associated with the event-logging functions. FIG. 6 illustrates just two examples as Log 1 and Log 8, each which includes format specifiers such as "% fname" and "% s," respectively. At operation 614, the provenance tracker 150 can generate regular expressions from the log message strings. In some embodiments, the regular expressions include a template format of the log message strings that replace format specifiers with runtime-dependent arguments. Thus, in the illustrated example for Log 1, "Opened file "% fname"," the "% fname" specifier has been replaced with runtime-dependent argument, .*.

With continued reference to the program code analysis, at operation 618, the provenance tracker 610 can further identify, via control flow analysis, multiple possible control flow paths of the log message strings (LMS) through the control flow graph. These possible LMS control flow paths can be understood as all possible temporal paths of the LMS in different execution of the program. At operation 622, the provenance tracker store, in the LMS control flows path database 166 of the computer storage 140, for access during the runtime execution, the multiple possible LMS control flow paths. At operation 624, the provenance tracker 150 can input the multiple possible LMS control flow paths from the database 166 to the log parser 170 to bootstrap interpretation of application events. The term bootstrap may be understood as a technique of loading a program into a computer by means of a few initial instructions that enable the introduction of the rest of the program from an input device, e.g., the computer storage 140 in one embodiment. Except for operation 624, in some embodiments, the operations of the program code analysis 602 are performed offline, e.g., in a computing system with access to the program code without executing the program code.

In various embodiments, in the program code analysis 630 performed at runtime, a system auditor (e.g., a Linux audit module in one embodiment) generates a whole-system provenance graph that includes system logs. At operation 634, the provenance tracker 150 may collect or retrieve the system logs from an underlying kernel-level provenance tracker of the system auditor. Concurrently, a kernel module within the kernel space of the OS 144 captures event messages generated by execution of the one or more applications. To do so, the kernel module can intercept write system calls (syscall) on the operating system and identify ones of the write system calls that belong to identified application event-logging behavior. At operation 638, the provenance tracker 150 may capture these application event messages and augment the application event messages with the PID/TID of the application and timestamp of each log event. In this way, the provenance tracker 150 associates the system logs with the appropriate application events using the PID/TID as a disambiguator. At operation 640, the provenance tracker generates a universal log file from a combination of system logs and these process-specific event log messages of the one or more applications.

In various embodiments, in the investigation analysis 650 (such as an attack investigation responding to an attack alert or symptom event), at operations 652 and 624, the provenance tracker 150 passes the universal log file and the LMS control flow paths DB 166 to the log parser 170. In some embodiments, the log parser 170 partitions associated processes in the universal log file, which has a foundation in the whole-system provenance graph, by inserting a new application log vertex (app log vertex) into the whole-system provenance graph. The provenance tracker 150 (e.g., the graph generator 174) can connect the vertex to the corresponding partitioned process and annotate the vertex with one or more corresponding process-specific event log messages in an identified execution unit of the process. This semantic-aware and execution-partitioned graph is called the Universal Provenance Graph (UPG) 180, which can be presented to the investigator, e.g., via the GUI 130 of the detection server 120.

Figure 7A:
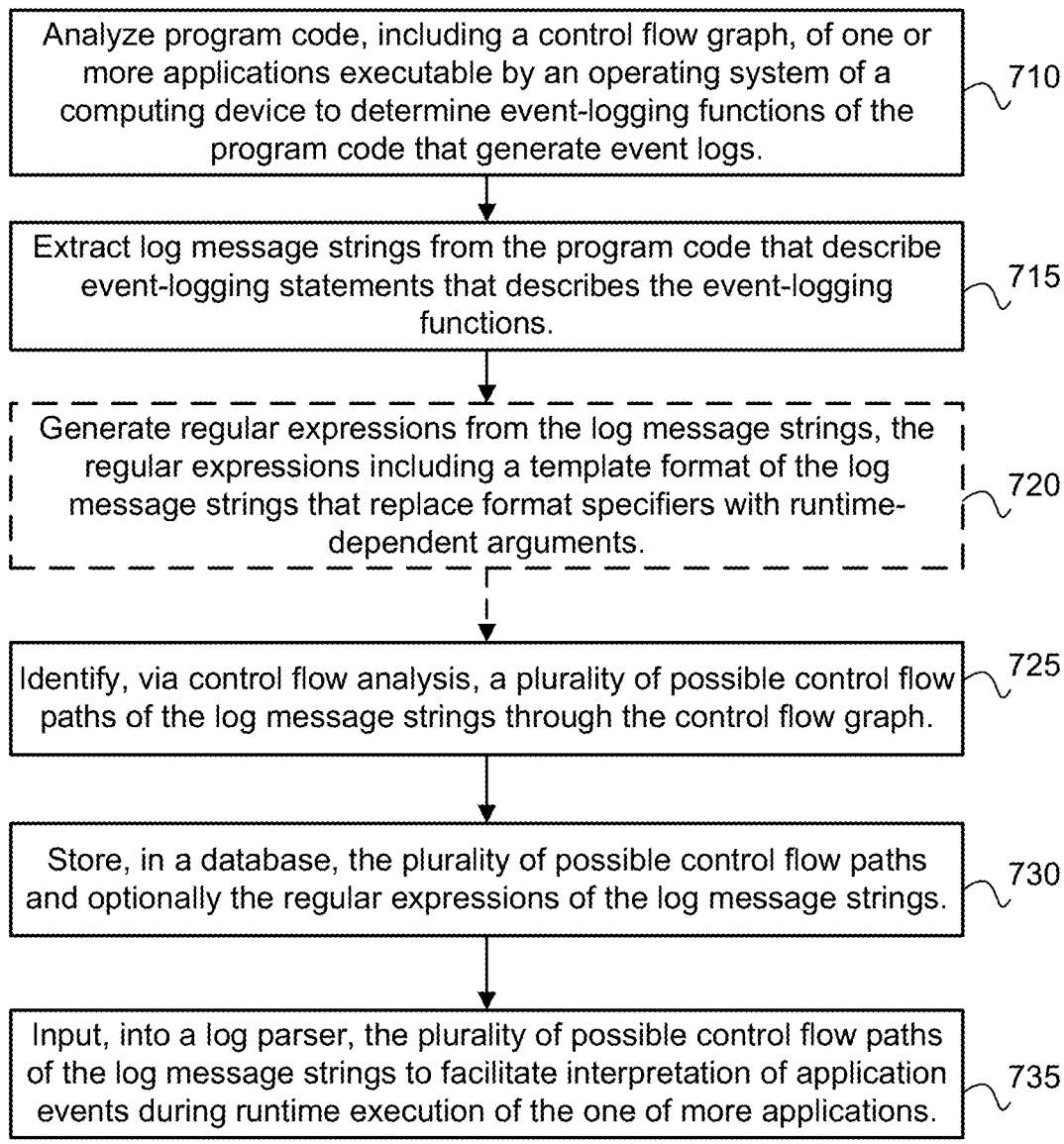
FIG. 7A is a flow chart of a method for analyzing application code to identify and store possible control flow paths of log message strings for use during interpretation of application events during runtime execution and generation of a universal provenance graph according to some embodiments.

FIG. 7A is a flow chart of a method 700A for analyzing application code to identify and store possible control flow paths of log message strings for use during interpretation of application events during runtime execution and generation of a universal provenance graph according to some embodiments. In some embodiments, the method 700A is performed consistent with the program code analysis 602 discussed with reference to FIG. 6. The method 700A can be performed by processing logic that can include hardware (e.g., processing device, circuitry, dedicated logic, programmable logic, microcode, hardware of a device, integrated circuit, etc.), software (e.g., instructions run or executed on a processing device), or a combination thereof. In some embodiments, the method 700A is performed by the detection server 120 (e.g., via execution of the provenance tracker 150 by the processing device 122) of FIG. 1.

Although shown in a particular sequence or order, unless otherwise specified, the order of the processes can be modified. Thus, the illustrated embodiments should be understood only as examples, and the illustrated processes can be performed in a different order, and some processes can be performed in parallel. Additionally, one or more processes can be omitted in various embodiments. Thus, not all processes are required in every embodiment. Other process flows are possible.

At operation 710, the processing logic analyzes program code, including a control flow graph, of one or more applications that are executable by an operating system of a computing device to determine event-logging functions of the program code that generate event logs.

At operation 715, the processing logic extracts, based on the event-logging functions, log message strings from the program code that describes event-logging statements.

At operation 720, the processing logic optionally generates regular expressions from the log message strings, the regular expressions including a template format of the log message strings that replace format specifiers with runtime-dependent arguments.

At operation 725, the processing logic identifies, via control flow analysis, multiple possible control flow paths of the log message strings through the control flow graph.

At operation 730, the processing logic stores, in a database, the multiple possible control flow paths.

At operation 735, the processing logic inputs, into a log parser, the multiple possible control flow paths of the log message strings to facilitate interpretation of application events during runtime execution of one or more applications. These operations will be discussed in more detail hereinafter.

Figure 7B:
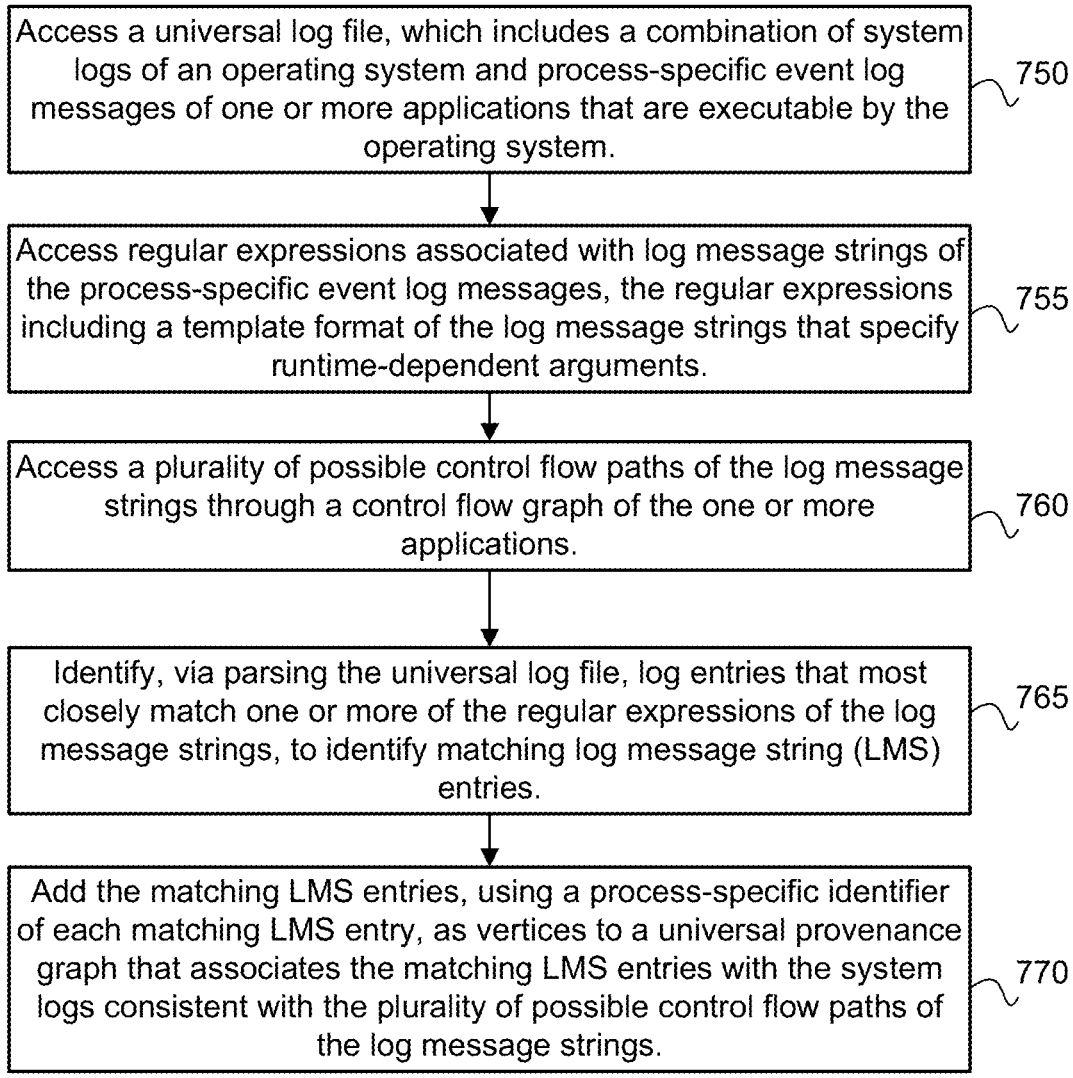
FIG. 7B is a flow chart of a method for use of a universal log file, regular expressions associated with log message strings, and the possible control flow paths of FIG. 7A to generate a universal provenance graph according to some embodiments.

FIG. 7B is a flow chart of a method 700B for use of a universal log file, regular expressions associated with log message strings, and the possible control flow paths of FIG. 7A to generate the universal provenance graph (UPG) 180 according to some embodiments. In some embodiments, the method 700B is performed consistent with the investigation analysis 650 discussed with reference to FIG. 6. The method 700B can be performed by processing logic that can include hardware (e.g., processing device, circuitry, dedicated logic, programmable logic, microcode, hardware of a device, integrated circuit, etc.), software (e.g., instructions run or executed on a processing device), or a combination thereof. In some embodiments, the method 700B is performed by the detection server 120 (e.g., via execution of the provenance tracker 150 by the processing device 122) of FIG. 1.

Although shown in a particular sequence or order, unless otherwise specified, the order of the processes can be modified. Thus, the illustrated embodiments should be understood only as examples, and the illustrated processes can be performed in a different order, and some processes can be performed in parallel. Additionally, one or more processes can be omitted in various embodiments. Thus, not all processes are required in every embodiment. Other process flows are possible.

At operation 750, the processing logic accesses a universal log file, which includes a combination of system logs of an operating system and process-specific event log messages of one or more applications that are executable by the operating system.

At operation 755, the processing logic accesses regular expressions associated with log message strings of the process-specific event log messages, the regular expressions including a template format of the log message strings that specify runtime-dependent arguments.

At operation 760, the processing logic accesses multiple possible control flow paths of the log message strings through a control flow graph of the one or more applications.

At operation 765, the processing logic identifies, via parsing the universal log file, log entries that most closely match one or more of the regular expressions of the log message strings, to identify matching log message string (LMS) entries.

At operation 770, the processing logic adds the matching LMS entries, using a process-specific identifier of each matching LMS entry, as vertices to a universal provenance graph that associates the matching LMS entries with the system logs consistent with the multiple possible control flow paths of the log message strings. These operations will be discussed in more detail hereinafter.

The program code analysis 602 profiles the program code of applications before their execution. During such analysis, the provenance tracker 150 performs several passes over the control flow graph (CFG) of the program code to identify logging behaviors and generate all possible LMS control flow paths that are possible during execution of an application. Specifically, we leverage the Angr toolchain to build the CFG, and then introduce new methods to identify logging procedures in the program code. In various embodiments, the program code being analyzed is source code or compiled code such as the computer or binary code executed by a computing system or device. In some cases, program code analysis imposes high costs, especially when symbolic execution and emulation are necessary. In what follows, we describe how the provenance tracker 150 avoids prohibitive analysis costs while profiling application-logging behaviors. Algorithm 1 offers a high-level overview of our static analysis routines.

FIG. 8 is pseudo-code of processes (Algorithm 1) describing program code analysis of application event logs and creation of log message string control flow paths according to various embodiments. With continued reference to the identification of event-logging functions or procedures at operation 606 of the system architecture 600 (FIG. 6), the ecosystem of event-logging frameworks is heterogeneous, e.g., of diverse character or content. To overcome the resulting issues, in some embodiments, the provenance tracker 150 identifies logging procedures in a binary by analyzing behavior of the program code.

In one embodiment, the provenance tracker 150 detects that applications use either libraries (e.g., syslog, log 4c, or the like) known to generate event logs or functionally-similar routines (also known to generate event logs) to produce, store, and flush log messages to the universal log file discussed with reference to FIG. 6. Such libraries or custom routines leverage the I/O procedures of Libc, such as fprintf or snprintf, to write the log messages to disk. The provenance tracker 150 can thus identify candidate logging procedures through a backward traversal of the CFG from these procedures call sites.

In another embodiment, the provenance tracker 150 detects a path of the one or more applications to a log storage directory associated with execution of the one or more applications. This is because most applications that create event logs store messages in the /var/log/ (or other equally well-known) directory by default. Thus, the provenance tracker 150 can differentiate log I/O from other I/O based on the file path and consider the procedures or functions that write to the log storage directory as logging procedures. Combining detection of these two behaviors was sufficient to identify logging behaviors for applications in our evaluation dataset. Nevertheless, the provenance tracker 150 also provides an interface that system administrator ("sysadmins") can use to add the names of their logging procedures, if the program code does not follow the aforementioned conventions.

With continued reference to the extracting log message strings (LMS) at operation 610 of FIG. 6, the provenance tracker 150 can assign a unique identifier for each logging procedure callsite. The provenance tracker 150 can generate an LMS that describes the format specifier arguments (template) of the log message, e.g., runtime-dependent arguments. In this analysis, the provenance tracker 150 can extract the a full control flow graph of the program code and perform symbolic execution to extract the values of such arguments. We henceforth refer to this process as concretization, which identifies additional details about the LMS. However, performing a complete symbolic execution over the program code is a computationally expensive operation that leads to the path explosion problem, especially for applications with complex compile-time optimizations. In fact, while experimenting with the applications listed in Table III, we realized that most applications are compiled with at least the —O2 compiler optimization level, which greatly complicated the task of CFG extraction and symbolic execution. For example, when we used the Angr toolset, extracting the CFG and performing symbolic execution on the openssh server binary quickly exhausted 64 GB of memory on our experimental machine and did not return a conclusive result, even after running for several hours.

To overcome that problem, in most embodiments of symbolic execution, the provenance tracker 150 primarily works to obtain the format specifier arguments for logging function calls. Therefore, the provenance tracker 150 first references the CFG built without symbolic execution (referred to as a FastCFG in Angr toolset), which is generated by traversing the program code and using several behavioral detections to resolve indirect jumps. This approach greatly reduces the CFG computational and memory requirements. Using the FastCFG, the provenance tracker 150 identifies the basic blocks that contain function calls or jumps to logging procedures, and thus can focus primarily on such basic blocks. Nevertheless, unlike the full CFG, the FastCFG does not retain any state about the program code that would allow the provenance tracker 150 to concretize the values of the arguments of the logging procedures.

To complete the analysis, we introduce an optimized concretization we refer to as peephole concretization (see Algorithm 1 in FIG. 8). While studying the code of the open-source programs shown in Table III, we observed that for the most part, format specifier arguments to logging procedures are passed either (1) as direct constant strings or (2) through constant variables defined near the procedure call. For example, consider the call to the debug logging procedure in the OpenSSH application shown in FIGS. 5A-5C. The LMS we are interested in extracting is the message "PAM: password authentication accepted for %.100s" passed directly as a constant to the function call. At the machine instructions level, that observation reflects the fact that LMSes are typically defined within the same basic block that ends with the call or jump instruction to the address of a logging function, or in a nearby preceding block.

Using peephole concretization, the provenance tracker 150 may only need to perform local symbolic execution starting from the basic blocks identified previously, stopping directly after executing the call instruction to the target logging procedure. If the symbolic execution task of a given basic block b fails to concretize LMS values, the provenance tracker 150 then launches new symbolic execution tasks from each of b's predecessors (referred to as b.predecessors( ) in Algorithm 1). We refer to the operation of restarting symbolic execution from a basic block's predecessors as backtracing. the provenance tracker 150 bounds the computational resources employed for the concretization by halting symbolic execution after performing maxBackTrace backtrace operations from a given block b. If symbolic execution fails to produce concretized LMS values after maxBackTrace operations, the provenance tracker 150 marks the function as unresolved and thus produces incomplete LMS paths.

Algorithm 1, however, may yield ambiguous LMS paths in the rare cases in which the function call can have different format specifiers based on the sequence of basic blocks that lead to it (e.g., context sensitivity). The provenance tracker 150 address that challenge during the peephole concretization by recording the call stack that produced each LMS. If two different call stacks produce different log message strings (LMSes) for the logging function call, the provenance tracker 150 creates a new LMS for each call and then associates the new LMS with the topmost basic block of a corresponding event-logging function call. That process may ensure that the provenance tracker 150 does not miss an LMS and that we do not over-approximate the reachability between log message strings when constructing the LMS control flow paths.

With continued reference to generating LMS regular expressions at operation 614 of the program code analysis 602 of FIG. 6, once an LMS has been concretized, the provenance tracker 150 extracts a regular expression ("regex") that can be used to match event messages at runtime. The resulting regex describes the format specifiers in the LMS that depend on runtime context (e.g., % s, % d, %% s). Each format specifier is replaced with a suitable runtime-dependent argument, e.g., "% d" with "[0-9]+" and "% s" with "." to generate the regular expression or regex. For example, one LMS we encounter in OpenSSH is "PAM: password from user %.12s accepted." After extraction and replacement, the provenance tracker 150 generates the regex of "PAM: password from user.* accepted."

With continued reference to generating LMS control flow paths at operation 618 of the program code analysis 602 of FIG. 6. After concretizing LMS with selective symbolic execution, the provenance tracker 150 can continue to use the FastCFG to enumerate the valid sequences of LMS that can appear in a typical lifecycle of the application. Extraction of all the possible paths is not a direct application of depth-first traversal (DFS), as DFS renders an under-approximation of the possible paths for the following reasons. (1) The same basic blocks can be called from different callees and thus must be traversed multiple times. (2) Function calls (i.e., call instructions) must be matched with their appropriate return or jump instructions. Finally, (3) the applications we study use an abundance of loops and recursive functions that must be traversed multiple times in order to avoid skipping over loop paths. Instead, our approach addresses (1) and (2) by using caching and temporary nodes, and (3) by using fixed-point iterations. Pseudo-code for the control flow path building algorithm (BUILDLMSPATHS) of the provenance tracker 150 is given in Algorithm 1 (FIG. 8).

Instead of traversing the full binary's CFG, the provenance tracker 150 subdivides the path identification task into several function-local traversals that generate a set of subgraphs for each function in the program code. The provenance tracker 150 can then interlink the set of subgraphs by following call instructions and return or jump instructions to identify the multiple possible control flow paths through the control flow graph and build the full LMS paths. For each function, f, in the functions of the program code (referred to as cf g.functions( ) in Algorithm 1), the provenance tracker 150 identifies one or more entry points of the function, in which control flow passes into the function, and one or more exist points of control flow out of the function, e.g., in which control flow crosses a local body of the function, creating temporary LMS nodes for these points. Then, the provenance tracker 150 can perform a local traversal of a subgraph of a function, starting from the one or more entry points, and traversing (or following) the control flow edges between the basic blocks that do not leave the address space of the function.

Every time the provenance tracker 150 encounters a basic block containing a log message string (LMS), that basic block corresponding to the log message string is added to the control flow path, and traverses outgoing edges of the basic block. To accurately capture looping behavior, the provenance tracker 150 performs a fixed-point iteration over the loop edges until no further changes occur to the LMS control flow paths being generated. In other words, the provenance tracker 150 traverses a loop of the function multiple times, and for each loop traversal, detects loop-execution behavior of a function of the program code. The provenance tracker 150 may continue traversing the same loop edge of the function until no further LMS control flow paths are detected. The provenance tracker 150 can record paths of any new log message strings (LMSes). The provenance tracker 150 then considers the loop edge to be exhausted and moves to the next control flow edge. Finally, to speed up the traversal, the provenance tracker 150 may cache processed basic blocks so that the provenance tracker 150 needs to only traverse them once if multiple paths coincide.

In some embodiments, the provenance tracker 150 may not consider any loops that do not contain any syscalls because such loops do not produce audit logs and thus cannot be used for execution partitioning. Thus, the provenance tracker 150 can mark any log message strings inside of the loop that do not have system calls before or after the loop, and in response to detecting no new log message strings, exit execution of the loop.

After building the function-local subgraphs, the provenance tracker 150 resolves the call and jump instructions in each of them to complete the full LMS paths. For each function call that is on an LMS path, the provenance tracker 150 injects the subgraph of the callee into the path by creating links between the basic block of the callee and the entry points of the callee and between the exit points of the callee (return blocks and jump instructions targeting the caller) and the return basic block of the callee. Using this approach, the provenance tracker 150 completes the full LMS paths while also handling recursive functions by creating self-cycles. Subsequently, the provenance tracker 150 compresses the graph by removing the temporary LMS nodes created by the BUILDLMSPATHS function and merging their fan-in and fan-out edges. The resulting compressed graph will then contain all the detected LMS paths.

FIGS. 9A and 9B are, respectively, a code snippet of the LMS control flow paths and a flow chart illustrating the LMS control flow paths representation of the code snippet according to an embodiment. The back edge from log 3 to log 2 just shows that these logs are inside a loop and can appear more than one time.

In some embodiments, LMS control flow paths guide the provenance tracker 150 to partition the universal log file into execution units; however, in some applications, printed LMSes in the event-handling loop are not precise enough to partition the loop. For example, Redis event-handling loop shown in FIG. 5A prints two LMSes in each iteration of the event-handling loop. The first LMS is printed after the accept syscall and if the provenance tracker 150 partitions the event-handling loop based on the both first and second LMSes, then the provenance tracker 150 can miss that accept syscall in the execution unit and only capture syscalls that happened in between two LMSes. However, if the provenance tracker 150 partitions the event-handling loop only on the second LMS then the provenance tracker 150 can generate correct execution units because there is no syscall after second LMS in the event-handling loop.

Thus, during LMS control flow paths construction, the provenance tracker 150 marks all the LMSes present inside the loops that do not have any syscalls before or after in that loop. Such marking helps the provenance tracker 150 to make correct execution partitioning of universal provenance log during the investigation phase. If there is no such LMS inside the loop, then the provenance tracker 150 keeps track of either all the syscalls present after the last LMS (loop-ending LMS) in the loop or all the syscalls present before the first LMS (loop-starting LMS) in the loop whichever has least number of syscalls. The provenance tracker 150 uses such syscall mappings during investigation phase to make correct execution units.

With continued reference to the runtime analysis 630 of the architecture 600 of FIG. 6, at runtime (e.g., execution of the one or more applications within the OS 144) in some embodiments, the provenance tracker 150 performs minimal maintenance of the application and whole-system logs; the LMS control flow path models are stored in LMS control flows path database 166 and are not consulted until an investigation is initiated. The primary runtime challenge for the provenance tracker 150 is that of reconciling logs from different layers, which is difficult when considering a flattened event log of concurrent activities in multi-threaded applications.

To address this challenge, the provenance tracker 150 intercepts write system calls (e.g., syscalls) on the host using a kernel module and identifies which write system calls belong to application event logging using logging behavioral analysis discussed previously. Subsequently, the provenance tracker 150 can append the PID/TID of the process (or thread) that emitted the event along with the timestamp of the event's occurrence to the identified log messages, generating enhanced event log messages. The provenance tracker 150 can employ the Linux Audit API to add the enhanced event log message to the universal log file, which in this case is a whole-system provenance log file that provides an ordering for both application-level and system-level events.

With continued reference to the investigation analysis 650 of the architecture 600 of FIG. 6, in various embodiments, following an attack, an administrator can query the log parser 170 and the graph generator 174 (FIG. 1; FIG. 6) to construct the UPG 180, chronicling the system-layer and application-layer events related to the intrusion. Given program code of the one or more applications, whole-system provenance logs (e.g., from the universal log file), and application event logs, during the investigation phase, the provenance tracker 150 can generate a UPG while preserving the three properties of causality analysis.

FIG. 10 is pseudocode of processes (Algorithm 2) describing UPG generation according to various embodiments. Algorithm 2 describes how to construct the backward-tracing UPG from the universal log file, specifically a backtrace query from an observable attack symptom event. The approach to building forward-trace graph follows naturally from this algorithm and is, therefore, but is described herein below. When an application event log (an augmented LMS) is encountered while parsing the universal log file (Function ISAPPENTRY(e) in Algorithm 2), the provenance tracker 150 can match the event to a known LMS for the application in the LMS control flow paths. That matching is performed by the MATCHLMS function as described below. In disclosed embodiments, the log parser 170 and/or the graph generator 174 can perform the functionality of the generation of the UPG 180.

In one embodiment, the provenance tracker 150 detects an attack system event; determines the matching LMS entries for each event that occurred before the attack system event within the universal log file; generates a backward-tracing provenance graph from the matching LMS entries; and identifies, from the backward-tracing provenance graph, an event log with information identifying a source of the attack system event.

In another embodiment, the provenance tracker 150 detects an attack system event; determines the matching LMS entries for each event that occurred after the attack system event within the universal log file; generates a forward-tracing provenance graph from the matching LMS entries; and identifies, from the forward-tracing provenance graph, an event log with information identifying a source of the attack system event.

With additional specificity, the LMS state matching of Algorithm 2 can include matching of a given runtime application log entry to its associated LMS in the LMS control flow paths DB 166. For each log entry in the universal log file, the provenance tracker 150 identifies LMS regular expressions (regexes) that are candidate matches. For example, if the event message is "02/15/19 sshd [PID]: PAM: password from user root accepted," the provenance tracker 150 can look for substring matches, and this will solve the issue of identifying the actual application log entry from the preamble metadata, e.g., "02/15/19 sshd[PID]:".

In some embodiments, an application log entry may match to multiple LMS regexes in the LMS path DB; this happens because of the prevalence of the "% s" format specifier in LMSes, which can match anything. Therefore, the provenance tracker 150 can perform a ranking of all the possible candidate matches. The provenance tracker 150 can use regex matching to identify the number of non-regex expressions (e.g., constants) in each match. Going back to the example, "PAM: password from user root accepted" will match "PAM: password from user.* accepted" with a ranking of 5, which is equal to the number of non-regex word matches. Finally, the provenance tracker 150 returns the LMS that has the highest rank or the highest number of non-regex word matches that reflects the true state among the candidate LMSes. In summary, the provenance tracker 150 can, for each log entry of the universal log file, identify a multiple of the regular expressions of the log message strings that are candidate LMS matches. The provenance tracker 150 can further rank the candidate LMS matches based on a number of non-regular expression string values in each candidate LMS match; and selecting the candidate LMS match that has the highest number of the non-regular expression string values In some embodiments, to perform state machine matching, once the candidate LMS ($LMS_{cand}$) has been identified for an application log entry, the provenance tracker 150 attempts to match the candidate LMS to a valid LMS control flow path in the database 166. If this is the first event message, the provenance tracker 150 uses a set of behavioral-matching heuristics to figure out from where the provenance tracker 150 should start within the LMS control flow paths. However, since the matching process can start anywhere in the applications lifetime, usually the provenance tracker 150 can resort to an exhaustive search over all nodes in the LMS control flow paths. Once the provenance tracker 150 identifies the starting node, the provenance tracker 150 keeps state in the parser that points to the possible transitions in the LMS paths graph. Upon the next log entry, we search the neighbors of the previous LMS for possible candidate matches. We rank those and return the one with the highest rank, and then advance the parser's state pointer. If the provenance tracker 150 cannot find a match in the neighboring LMS states, it advances to the lookahead and lookback matching steps.

In some embodiments, the provenance tracker 150 can perform lookahead matching. When the previous state in the LMS path is known, the provenance tracker 150 may not find a match in a neighboring LMS state because for example (1) the application is running at a different log level, (2) the provenance tracker 150 missed the LMS corresponding to the log message in the program code analysis 602 (for example, the function might be inlined, or we could not concretize its values), or (3) the log message is coming from a third-party library. The provenance tracker 150 can therefore start looking deeper into the reachable states from the current parser state. If the provenance tracker 150 finds multiple candidates, the provenance tracker 150 again ranks the LMS candidates and returns the one with the highest rank. If the provenance tracker 150 does not find an additional LMS candidate, then the provenance tracker 150 keeps increasing the lookahead up until reaching a certain threshold that can be set at runtime. If the provenance tracker 150 finds a match, the provenance tracker 150 can move the log parser 170 to that state and repeat until matching a candidate LMS at the end of LMS control flow path. At that point, the provenance tracker 150 can set the endUnit flag to true.

More specifically, for extracting for each log message string, the provenance tracker 150 can extract the control flow graph from the program code for the one or more applications. The provenance tracker 150 can further identify, with reference to the control flow graph, a basic block associated with the log message string that ends in a call instruction to an event-logging function. The provenance tracker 150 can perform local symbolic execution that begins with the basic block and stops directly after executing the call instruction. The provenance tracker 150 can extract, based on the local symbolic execution, values of one or more format-specified arguments of the log message string.

Further, when the local symbolic execution fails to resolve the values of the format-specified arguments, the provenance tracker 150 can further perform local symbolic execution of each of one or more predecessor blocks to the basic block.

The provenance tracker 150 can further halt the local symbolic execution of the one or more predecessor blocks after a threshold maximum number of operations, and extract, based on the local symbolic execution of the one or more predecessor blocks, values of one or more format-specified arguments of the log message string.

As described previously, in certain cases, an LMS may not be able to correctly partition the execution of program code because there are syscalls after the loop-ending LMS or syscalls before loop-starting LMS. During offline analysis, the provenance tracker 150 marks such LMS(es) and keeps track of the syscalls that one should expect during runtime. If the provenance tracker 150 observes such a case during state matching process, the provenance tracker 150 matches those syscalls besides matching LMS and adds those syscalls into the execution unit. Function MATCHLMS in Algorithm 2 also handles such cases and appropriately sets the endUnit flag to true.

In some embodiments, the provenance tracker 150 can perform lookback matching. If the above lookahead matching fails because the provenance tracker 150 cannot find the end state in the LMS path, then the provenance tracker 150 can first try to search the heads of loops that are of the form (while(1), for(;;)) in the LMS control flow path. The intuition behind loop head identification is that the provenance tracker 150 might have reached the start of a new execution unit and thus the provenance tracker 150 would need to restart from a new stage or unit. If lookback matching fails, then the provenance tracker 150 can perform an exhaustive search of LMS that can happen before the current state in the LMS paths using the same intuition mentioned before. If in either case, the provenance tracker 150 finds a match, the provenance tracker 150 can set the endUnit flag to true. Note that lookback matching allows the generation of execution units even if the provenance tracker 150 has only one log message at start or end of the loop, because the provenance tracker 150 can use the next execution unit's log message to partition the current execution unit.

Information theft Attack: An administrator made a mistake when configuring an FTP server, allowing users to read and transfer sensitive files from the server's directories. The issue was identified after several days, but the administrator now needs to identify which files were leaked, if any, to ensure that company secrets are safe. Using the sensitive files as a symptom, the administrator runs a backtrace query.

Figures 11A, 11B:
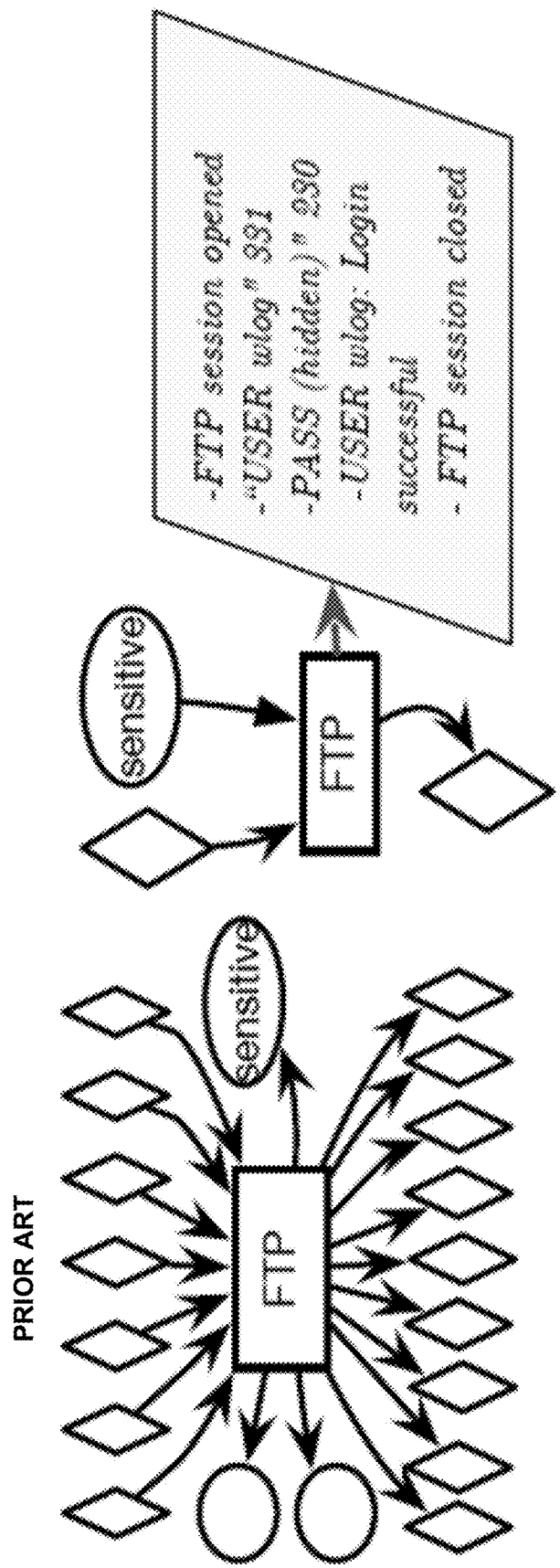
FIG. 11A is a provenance graph of an information theft attack using a conventional solution that leads to dependency explosion problem with no semantic information according to an embodiment.
FIG. 11B is a concise provenance graph generated using the disclosed system with semantic information according to an embodiment.

In performing an investigation, FIG. 11A is a provenance graph of an information theft attack using a conventional solution that leads to dependency the explosion problem with no semantic information according to an embodiment. FIG. 11A shows the attack investigation results using a conventional causal analysis solution, which confirms that the sensitive file was accessed. However, due to dependency explosion, one cannot determine who accessed the file and to where it was transferred. In contrast, FIG. 11B is a concise universal provenance graph (UPG) 180 generated using the disclosed provenance tracker 150 with semantic information according to an embodiment. The provenance tracker 150 was able to partition the server into individual units of work based on event log analysis, removing the dependency explosion and identifying an IP address to which the sensitive file was downloaded. However, this information may not prove precise enough to attribute the attack to a particular employee or remote agent; fortunately, because the provenance tracker 150 was able to associate the causal graph with event messages from the FTP server, the administrator is able to attribute the theft to a specific set of user credentials.

Phishing Email: An employee uses the Mutt email client to send and receive personal emails on a BYOD workstation. One day, the employee receives a phishing email that offers a torrent for downloading a blockbuster movie. They open the email, download the attached.torrent file, Transmission downloads the purported movie file and opens it, but the file is actually malware that established a backdoor on the machine.

Figure 12A:
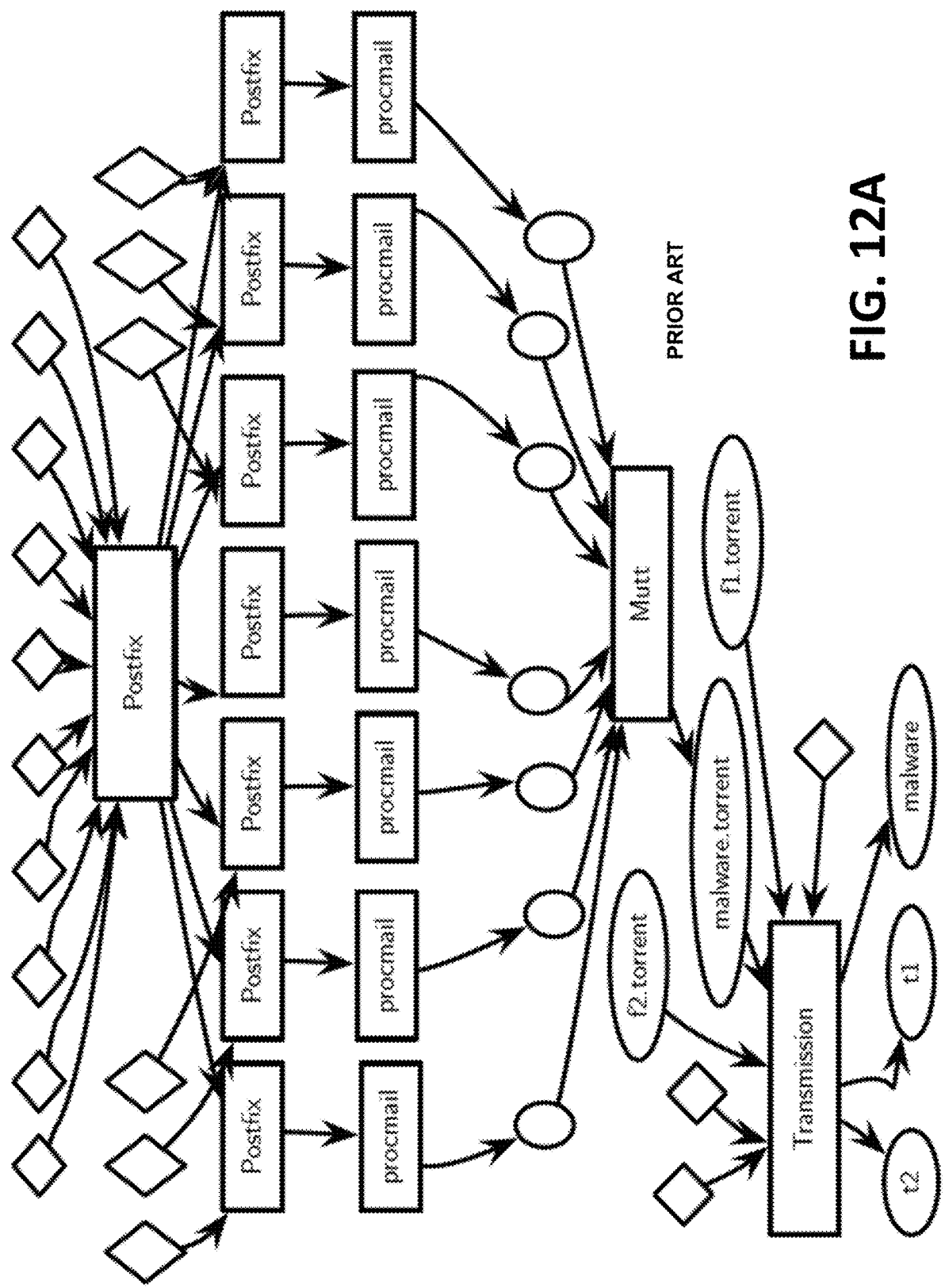
FIG. 12A is a provenance graph of a phishing email attack using conventional solutions according to an embodiment.

In performing an investigation, an administrator later notices that a suspicious program is running on the workstation and initiates forensic analysis to identify its origin. FIG. 12A is a provenance graph of a phishing email attack using conventional solutions according to an embodiment, e.g., based on a simple, conventional auditd. As can be seen in the CFG of FIG. 12A, the employee has actually opened three.torrent files with a transmission-daemon. One cannot determine which.torrent input file leads to the malware download. Even if out-of-band knowledge is used to identify the malicious torrent, the administrator will still be unable to trace back to the phishing email.

Figure 12B:
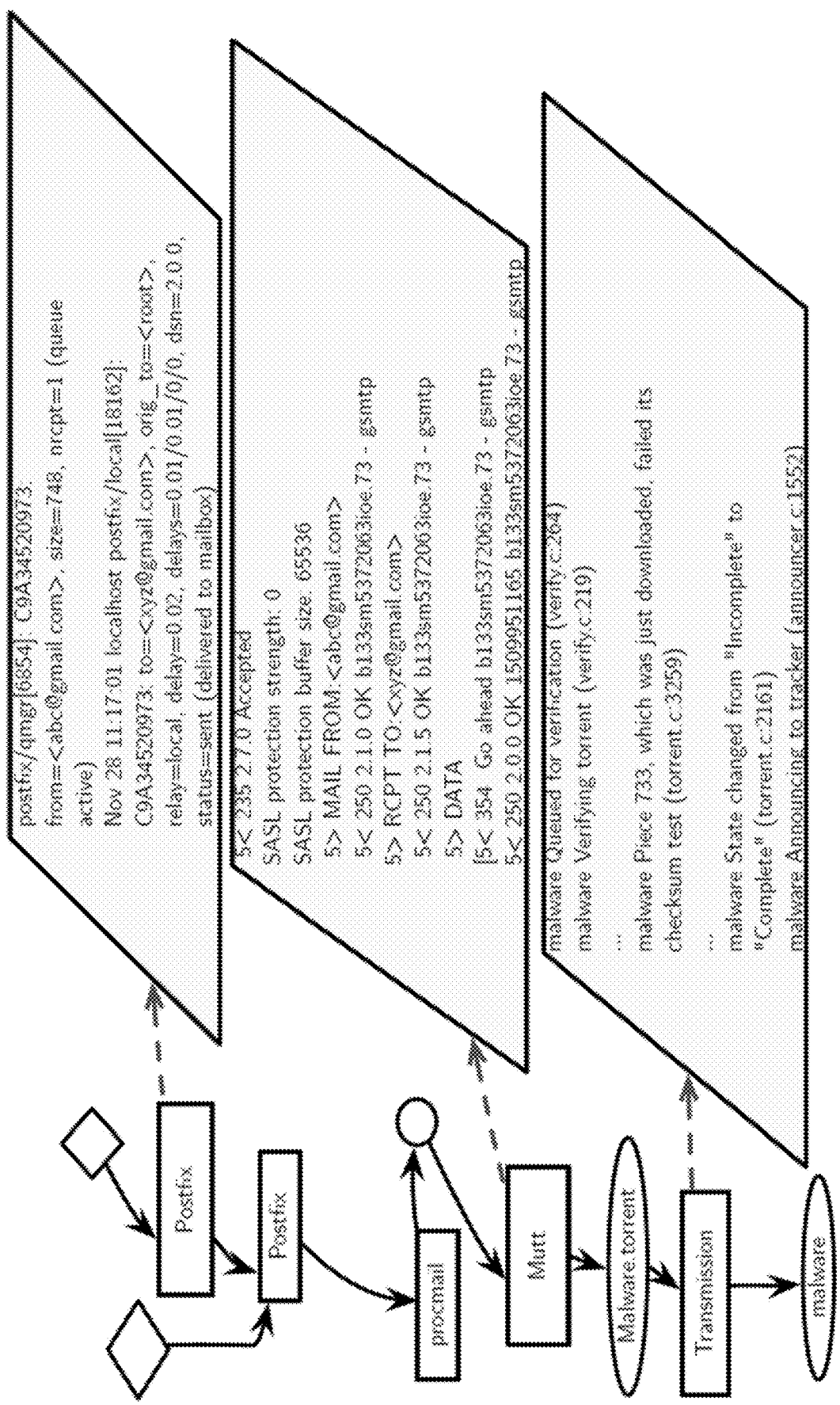
FIG. 12B is a flow graph illustrating the semantic-aware and execution partitioned generation of a universal provenance graph according to disclosed embodiments.

FIG. 12B is a flow graph illustrating the semantic-aware and execution partitioned generation of a universal provenance graph according to disclosed embodiments. The UPG of FIG. 12B is generated by the provenance tracker 150. Because the provenance tracker 150 successfully partitioned the Postfix and Transmission processes, the graph does not exhibit dependency explosion, making it easy to trace from the suspicious process back to the phishing email. Further, the UPG provides additional documentation of application semantics, such as the email address of the sender, which may help the administrator correlate this attack with other intrusions.

Logging Practices. The effectiveness of the provenance tracker 150 for tackling the semantic gap problem depends on how semantically rich logging statements are in open source applications. Improving the log messages in order to improve the forensic investigation is orthogonal to the goal of the provenance tracker. However, we do recommend following guidelines to developers which can improve effectiveness of the provenance tracker 150. (1) Logging different events with forensically important metrics such as configuration values. (2) Do not print the same logging message at different locations in the source code. (3) Log message both at the start and end of each semantically independent event execution.

Malware Binaries. Malware binaries may not produce any application logs which are required for execution partitioning. In this case, the provenance tracker 150 treats the whole malware execution as one unit and does not provide execution partitioning. This is acceptable since every output and input event from malware execution is important in forensic analysis.

Results Generalization. Provided that an underlying binary analysis tool has generated a reasonably accurate CFG, there are two considerations when evaluating the generality by the provenance tracker. The first is whether or not the application being profiled includes logging events at key positions in the CFG such as the event handling loop. Our survey demonstrates that this is the case for 19 mature open source projects (100%). The second consideration is whether the event logging statements are correctly identified and extracted by the provenance tracker. Our evaluation demonstrates that we are able to identify log statements in all the profiled applications based on results of behavioral analytics to perform event logging extraction.

Inter-unit Dependency. BEEP system introduced inter-unit dependencies for some cases where a single execution unit itself was not enough to cover the semantically independent execution. In practice, these dependencies originate due to memory dependencies across threads. For example, the dependencies caused by the enqueue and dequeue operations of a task queue in Apache HTFPD. To find these dependencies, BEEP instrumented the application to emit special syscalls that help constructing these inter-unit dependencies. ω Log does not suffer from this problem of inter-unit dependency because it uses runtime application event logs and LMS control flow paths to find the execution boundaries. Even in the case of false negatives where we miss some implicit flow in our LMS control flow paths, our Lookahead/Lookback matching algorithms described previously can handle this case and find the start/end of the execution boundary.

Figure 13:
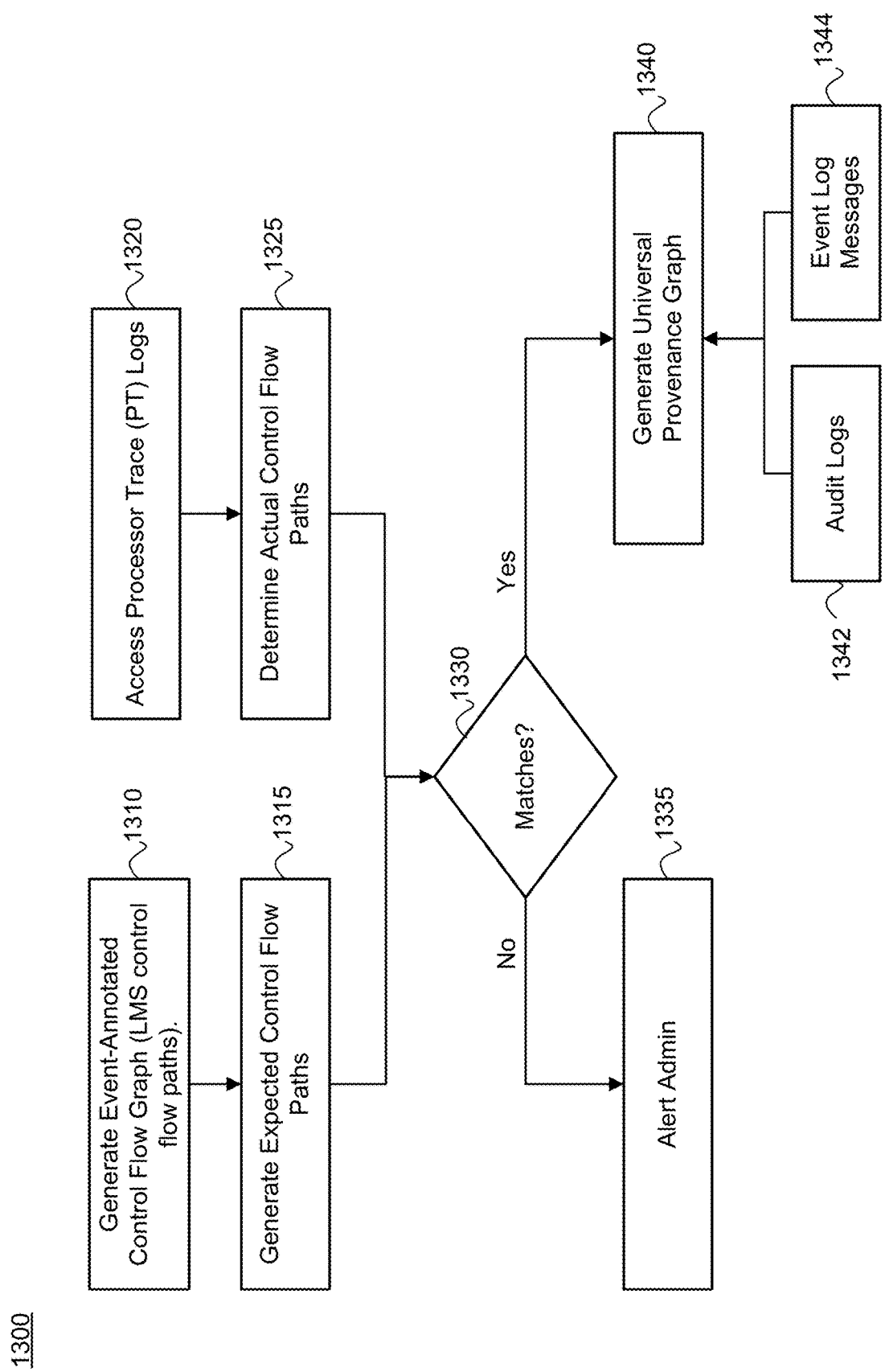
FIG. 13 is a flow chart of a method for using a textual description of how intended control of an application should appear in audit logs to detect compromise of execution of the application according to an embodiment.

FIG. 13 is a flow chart of a method 1300 for using a textual description of how intended control of an application should appear in audit logs to detect compromise of execution of the application according to an embodiment. The method 1300 can be performed by processing logic that can include hardware (e.g., processing device, circuitry, dedicated logic, programmable logic, microcode, hardware of a device, integrated circuit, etc.), software (e.g., instructions run or executed on a processing device), or a combination thereof. In some embodiments, the method 1300 is performed by the detection server 120 (e.g., via execution of the provenance tracker 150 by the processing device 122) of FIG. 1. Although shown in a particular sequence or order, unless otherwise specified, the order of the processes can be modified. Thus, the illustrated embodiments should be understood only as examples, and the illustrated processes can be performed in a different order, and some processes can be performed in parallel. Additionally, one or more processes can be omitted in various embodiments. Thus, not all processes are required in every embodiment. Other process flows are possible.

At operation 1310, the processing logic generates an event-annotated flow graph such as the LMS control flow paths stored in the LMS control flow paths DB 166.

At operation 1315, the processing logic generates an expected control flow paths of the one or more applications. In one embodiment, the processing logic determines, from multiple control flow paths, a textual description of how intended control of the one or more applications is to appear in audit logs that includes the system logs. This textual description can be fine-grained and detailed in terms of expected control flow of application events integrated within a whole-system provenance graph.

At operation 1320, the processing logic access processor trace (PT) data, such as generated by Intel® processors, that tracks values of the runtime-dependent arguments and execution of the one or more applications on the processing device 122.

At operation 1325, the processing logic determines actual control flow paths of the one or more applications using the PT data.

At operation 1330, the processing logic determines whether the actual control flow paths match the expected control flow paths. In this way, the processing logic can detect, using the textual description, a deviation in an expected execution sequence of the one or more applications.

At operation 1335, when the actual control flow paths do not match the expected control flow paths, the processing logic can trigger an alert of a potential attack. The detection server 120, for example, can flash the alert on the GUI 130, send an email or message to the admin, and/or sound an alarm through a speak of the I/O devices 128.

At operation 1340, when the actual control flows paths do match the expected control flow paths, the processing logic can generate a Universal Provenance Graph (UPG) 180 using a set of audit logs 1342 (e.g., system logs from the whole-system provenance graph) and a set of event log messages 1344 (e.g., emitted as application events by the one or more applications).

Figure 14:
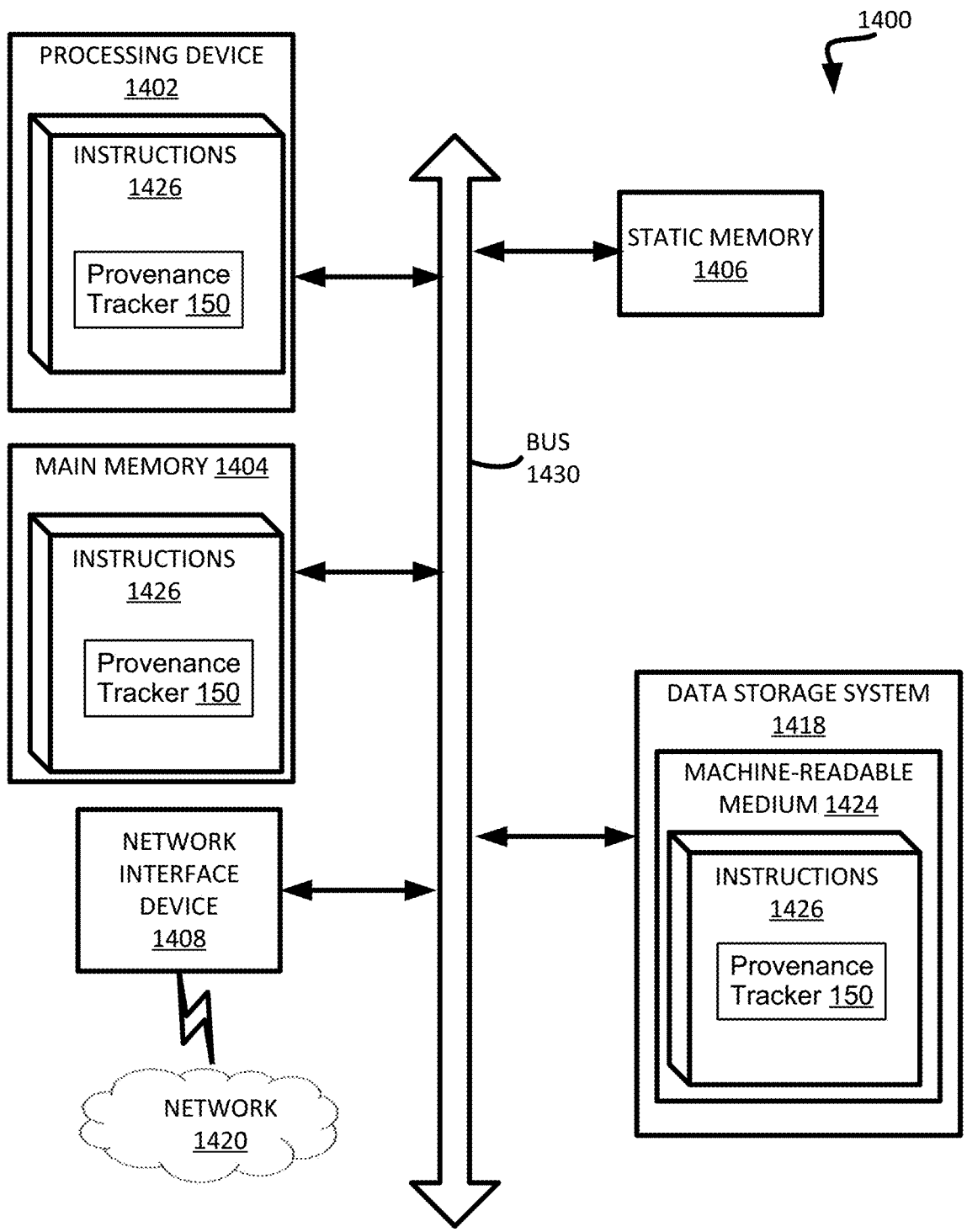
FIG. 14 is a block diagram of an example computer system in which embodiments of the present disclosure can operate.

FIG. 14 illustrates an example machine of a computer system 1400 within which a set of instructions, for causing the machine to perform any one or more of the methodologies discussed herein, can be executed. In some embodiments, the computer system 1400 can correspond to a host system, such as a server, or a hosted system, such as a client, both of which communicate across a network, and which authorities may want to investigate. In alternative embodiments, the machine can be connected (e.g., networked) to other machines in a LAN, an intranet, an extranet, and/or the Internet. The machine can operate in the capacity of a server or a client machine in client-server network environment, as a peer machine in a peer-to-peer (or distributed) network environment, or as a server or a client machine in a cloud computing infrastructure or environment.

The machine can be a personal computer (PC), a tablet PC, a set-top box (STB), a Personal Digital Assistant (PDA), a cellular telephone, a web appliance, a server, a network router, a switch or bridge, or any machine capable of executing a set of instructions (sequential or otherwise) that specify actions to be taken by that machine. Further, while a single machine is illustrated, the term "machine" shall also be taken to include any collection of machines that individually or jointly execute a set (or multiple sets) of instructions to perform any one or more of the methodologies discussed herein.

The example computer system 1400 includes a processing device 1402, a main memory 1404 (e.g., read-only memory (ROM), flash memory, dynamic random access memory (DRAM) such as synchronous DRAM (SDRAM) or Rambus DRAM (RDRAM), etc.), a static memory 1406 (e.g., flash memory, static random access memory (SRAM), etc.), and a data storage system 1418, which communicate with each other via a bus 1430. Any of a combination of the processing device 1402, the main memory 1404, or the data storage system 1418 may include the provenance tracker 150, e.g., in the form of instructions or logic, e.g., processing logic that may comprise hardware (e.g., circuitry, dedicated logic, programmable logic, microcode, etc.), firmware, software, or a combination thereof. The provenance tracker 150 may perform the analysis, processing, and logic involves with identifying log files, parsing a universal log file, generating a Universal Provenance Graph, and identifying attack surfaces or locations through an attack may have occurred, among other functionality previous discussed.

Processing device 1402 represents one or more general-purpose processing devices such as a microprocessor, a central processing unit, or the like. More particularly, the processing device can be a complex instruction set computing (CISC) microprocessor, reduced instruction set computing (RISC) microprocessor, very long instruction word (VLIW) microprocessor, or a processor implementing other instruction sets, or processors implementing a combination of instruction sets. Processing device 1402 can also be one or more special-purpose processing devices such as an application specific integrated circuit (ASIC), a field programmable gate array (FPGA), a digital signal processor (DSP), network processor, or the like. The processing device 1402 is configured to execute instructions 1426 for performing the operations and steps discussed herein. The computer system 1400 can further include a network interface device 1408 to communicate over the network 1420.

The data storage system 1418 can include a machine-readable storage medium 1424 (also known as a computer-readable medium) on which is stored one or more sets of instructions 1426 or software embodying any one or more of the methodologies or functions described herein. The instructions 1426 can also reside, completely or at least partially, within the main memory 1404 and/or within the processing device 1402 during execution thereof by the computer system 1400, the main memory 1404 and the processing device 1402 also constituting machine-readable storage media.

In one embodiment, the instructions 1426 include instructions to implement functionality corresponding to any OS, driver, software, or network stacked described herein. While the machine-readable storage medium 1424 is shown in an example embodiment to be a single medium, the term "machine-readable storage medium" should be taken to include a single medium or multiple media that store the one or more sets of instructions. The term "machine-readable storage medium" shall also be taken to include any medium that is capable of storing or encoding a set of instructions for execution by the machine and that cause the machine to perform any one or more of the methodologies of the present disclosure. The term "machine-readable storage medium" shall accordingly be taken to include, but not be limited to, solid-state memories, optical media, and magnetic media.

Some portions of the preceding detailed descriptions have been presented in terms of algorithms and symbolic representations of operations on data bits within a computer memory. These algorithmic descriptions and representations are the ways used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities. Usually, though not necessarily, these quantities take the form of electrical or magnetic signals capable of being stored, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. The present disclosure can refer to the action and processes of a computer system, or similar electronic computing device, that manipulates and transforms data represented as physical (electronic) quantities within the computer system's registers and memories into other data similarly represented as physical quantities within the computer system memories or registers or other such information storage systems.

The present disclosure also relates to an apparatus for performing the operations herein. This apparatus can be specially constructed for the intended purposes, or it can include a computer selectively activated or reconfigured by a computer program stored in the computer. Such a computer program can be stored in a computer readable storage medium, such as, but not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, each coupled to a computer system bus.

The algorithms and displays presented herein are not inherently related to any particular computer or other apparatus. Various general purpose systems can be used with programs in accordance with the teachings herein, or it can prove convenient to construct a more specialized apparatus to perform the method. The structure for a variety of these systems will appear as set forth in the description below. In addition, the present disclosure is not described with reference to any particular programming language. It will be appreciated that a variety of programming languages can be used to implement the teachings of the disclosure as described herein.

The present disclosure can be provided as a computer program product, or software, that can include a machine-readable medium having stored thereon instructions, which can be used to program a computer system (or other electronic devices) to perform a process according to the present disclosure. A machine-readable medium includes any mechanism for storing information in a form readable by a machine (e.g., a computer). In some embodiments, a machine-readable (e.g., computer-readable) medium includes a machine (e.g., a computer) readable storage medium such as a read only memory ("ROM"), random access memory ("RAM"), magnetic disk storage media, optical storage media, flash memory components, etc.

In the foregoing specification, embodiments of the disclosure have been described with reference to specific example embodiments thereof. It will be evident that various modifications can be made thereto without departing from the broader spirit and scope of embodiments of the disclosure as set forth in the following claims. The specification and drawings are, accordingly, to be regarded in an illustrative sense rather than a restrictive sense.

What is claimed is:

1. A system comprising:
a memory; and
one or more processing devices coupled to the memory, the one or more processing devices to:
analyze program code, including a control flow graph, of one or more applications executable by an operating system of a computing device to determine event-logging functions of the program code that generate event logs;
extract log message strings from the program code that describe event-logging statements associated with the event-logging functions;
generate regular expressions from the log message strings, the regular expressions comprising a template format of the log message strings that replace format specifiers with runtime-dependent arguments;

identify, via control flow analysis, a plurality of possible control flow paths of the log message strings through the control flow graph;

generate, during runtime execution of the program code on the computing device, a universal log file from a combination of system logs and process-specific event log messages of the one or more applications;

identify, via parsing the universal log file, log entries that most closely match one or more of the regular expressions of the log message strings, to identify matching log message string (LMS) entries; and add the matching LMS entries, using a process-specific identifier of each matching LMS entry, as vertices to a universal provenance graph that associates the matching LMS entries with the system logs consistent with the plurality of possible control flow paths of the log message strings.

2. The system of claim 1, wherein the universal provenance graph is an integrated-layered causal dependency graph in which the plurality of possible control flow paths of the log message strings of the one or more applications are integrated within multiple layers of a whole-system provenance graph that comprises the system logs.

3. The system of claim 1, wherein, for each vertex of the vertices added to the universal provenance graph, the one or more processing devices are further to:

connect the vertex to a process that is partitioned from the universal log file and corresponds to a matching LMS entry; and annotate the vertex with one or more corresponding process-specific event log messages in an identified execution unit of the process.

4. The system of claim 1, further comprising a computer storage, wherein the one or more processing devices are further to:

store, in a database of the computer storage, for access during the runtime execution, the plurality of possible control flow paths of the log message strings; and store, in the computer storage, the regular expressions.

5. The system of claim 1, wherein the one or more processing devices are further to:

capture event messages generated by execution of the one or more applications;

add, to respective event messages, using an instrumented code library, one of a process identifier (PID) or a thread identifier (TID) and a timestamp to generate the process-specific event log messages;

collect the system logs from a kernel-level provenance tracker of the operating system; and associate the system logs with corresponding process-specific event log messages using one or more of the PID, the TID, or the timestamp of the process-specific event log messages.

6. The system of claim 5, wherein, to capture the event messages, the processing device is further to:

intercept, using a kernel module of the operating system, write system calls on the operating system; and identify ones of the write system calls that belong to identified application event-logging behavior.

7. A method comprising:

analyzing, by a processing device, program code, including a control flow graph, of one or more applications that are executable by an operating system of a computing device to determine event-logging functions of the program code that generate event logs;

extracting, by the processing device based on the event-logging functions, log message strings from the program code that describes event-logging statements;

identifying, by the processing device, via control flow analysis, a plurality of possible control flow paths of the log message strings through the control flow graph;

storing, in a database accessible by the processing device, the plurality of possible control flow paths; and inputting, by the processing device into a log parser, the plurality of possible control flow paths of the log message strings to facilitate interpretation of application events during runtime execution of the one of more applications.

8. The method of claim 7, wherein the analyzing comprises at least one of:

determining the one or more applications include calls to libraries known to generate event logs or to functionally-similar routines known to generate event logs; or detecting a path of the one or more applications to a log storage directory associated with execution of the one or more applications.

9. The method of claim 7, wherein the extracting, for each log message string of the log message strings, comprises:

extracting the control flow graph from the program code for the one or more applications;

identifying, with reference to the control flow graph, a basic block associated with the log message string that ends in a call instruction to an event-logging function;

performing local symbolic execution that begins with the basic block and stops directly after executing the call instruction; and extracting, based on the local symbolic execution, values of one or more format-specified arguments of the log message string.

10. The method of claim 9, wherein, when the local symbolic execution fails to resolve the values of the format-specified arguments, the method further comprising:

performing local symbolic execution of each of one or more predecessor blocks to the basic block;

halting the local symbolic execution of the one or more predecessor blocks after a threshold maximum number of operations; and extracting, based on the local symbolic execution of the one or more predecessor blocks, values of one or more format-specified arguments of the log message string.

11. The method of claim 9, further comprising:

recording each call stack that produced the log message string;

in response to two different call stacks producing a different log message string while executing the call instruction, creating a new log message string for each execution of the call instruction; and associating, with each new log message string, a topmost basic block of a corresponding event-logging function call.

12. The method of claim 7, wherein the identifying comprises:

performing a plurality of function-local traversals of the control flow graph to generate a set of subgraphs, wherein each subgraph of the set of subgraphs corresponds to a function of the program code; and interlinking the set of subgraphs by following call instructions and return or jump instructions to identify the plurality of possible control flow paths through the control flow graph, the method further comprising, for each function of the program code:

identifying one or more entry points of control flow into the function;

identifying one or more exit points of control flow out of the function;

traversing the subgraph, starting at the one or more entry points, and following edges between basic blocks that do not leave an address space of the function;

in response to detecting a log message string, adding a basic block corresponding to the log message string to a control flow path of the plurality of possible control flow paths; and traversing outgoing edges of the basic block.

13. The method of claim 12, further comprising:

detecting loop-execution behavior of a function of the program code;

traversing a loop of the function multiple times, wherein traversing comprises:

recording paths of any new log message strings;

caching processed basic blocks of the loop;

marking any log message strings inside of the loop that do not have system calls before or after the loop; and in response to detecting no new log message strings, exiting execution of the loop.

14. The method of claim 12, further comprising:

generating a plurality of temporary LMS nodes for the one or more exit points to facilitate the traversing;

for each function that is a call, injecting a subgraph of a callee into the control flow path by creating links between the basic block of a caller and entry points of the callee and between exit points and a return basic block of the callee; and compressing the set of subgraphs by removing the temporary LMS nodes.

15. A non-transitory computer-readable storage medium storing instructions, which when executed by a processing device, cause the processing device to perform a plurality of operations comprising:

accessing a universal log file, which comprises a combination of system logs of an operating system and process-specific event log messages of one or more applications that are executable by the operating system;

accessing regular expressions associated with log message strings of the process-specific event log messages, the regular expressions comprising a template format of the log message strings that specify runtime-dependent arguments;

accessing a plurality of possible control flow paths of the log message strings through a control flow graph of the one or more applications;

identifying, via parsing the universal log file, log entries that most closely match one or more of the regular expressions of the log message strings, to identify matching log message string (LMS) entries; and adding the matching LMS entries, using a process-specific identifier of each matching LMS entry, as vertices to a universal provenance graph that associates the matching LMS entries with the system logs consistent with the plurality of possible control flow paths of the log message strings.

16. The non-transitory computer-readable storage medium of claim 15, wherein the universal provenance graph is an integrated-layered causal dependency graph in which the plurality of possible control flow paths of the log message strings of the one or more applications are integrated within multiple layers of a whole-system provenance graph comprising the system logs.

17. The non-transitory computer-readable storage medium of claim 15, wherein, for each vertex of the vertices added to the universal provenance graph, the plurality of operations further comprise:

connecting the vertex to a process that is partitioned from the universal log file and corresponds to a matching LMS entry; and annotating the vertex with one or more corresponding process-specific event log messages in an identified execution unit of the process.

18. The non-transitory computer-readable storage medium of claim 15, wherein the plurality of operations further comprise:

detecting an attack system event;

determining the matching LMS entries for each event that occurred before the attack system event within the universal log file;

generating a backward-tracing provenance graph from the matching LMS entries; and identifying, from the backward-tracing provenance graph, an event log with information identifying a source of the attack system event.

19. The non-transitory computer-readable storage medium of claim 15, wherein the plurality of operations further comprise:

detecting an attack system event;

determining the matching LMS entries for each event that occurred after the attack system event within the universal log file;

generating a forward-tracing provenance graph from the matching LMS entries; and identifying, from the forward-tracing provenance graph, an event log with information identifying a source of the attack system event.

20. The non-transitory computer-readable storage medium of claim 15, wherein the plurality of operations further comprise:

determining, from the plurality of control flow paths, a textual description of how intended control of the one or more applications is to appear in audit logs that includes the system logs;

detecting, using the textual description, a deviation in an expected execution sequence of the one or more applications; and triggering, in response to the detection, an alert of a potential attack.

21. The non-transitory computer-readable storage medium of claim 15, wherein the plurality of operations for the identifying further comprise, for each log entry of the universal log file:

identifying a plurality of the regular expressions of the log message strings that are candidate LMS matches;

ranking the candidate LMS matches based on a number of non-regular expression string values in each candidate LMS match; and selecting the candidate LMS match that has a highest number of the non-regular expression string values.

22. The non-transitory computer-readable storage medium of claim 21, wherein the plurality of operations further comprise:

searching the control flow graph to identify a control flow path that matches the selected candidate LMS match;

retaining a state associated with a subset of the plurality of possible control flow paths that are possible transitions within an LMS control flows graph;

in response to processing a next log entry of the universal log file, searching neighbor nodes of a previous LMS for a set of possible candidate path matches of a control flow path start point for the selected candidate LMS match;

ranking the set of possible candidate path matches according to relevance to the selected candidate LMS match; and selecting a highest ranked of the set of possible candidate path matches as the control flow path start point for generating the universal provenance graph.

* * * * *